US012573740B2

(12) United States Patent
Huang et al.

(10) Patent No.: US 12,573,740 B2
(45) Date of Patent: Mar. 10, 2026

(54) LOW WIND-LOAD ANTENNA

(71) Applicant: Outdoor Wireless Networks LLC, Claremont, NC (US)

(72) Inventors: Joy Huang, Plano, TX (US); Amit Kaistha, Coppell, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/581,586

(22) Filed: Feb. 20, 2024

(65) Prior Publication Data

US 2024/0195042 A1 Jun. 13, 2024

Related U.S. Application Data

(63) Continuation of application No. 17/231,447, filed on Apr. 15, 2021, now Pat. No. 11,936,092.

(60) Provisional application No. 63/073,070, filed on Sep. 1, 2020, provisional application No. 63/018,626, filed on May 1, 2020.

(51) Int. Cl.
*H01Q 1/00* (2006.01)
*H01Q 1/24* (2006.01)
*H01Q 1/42* (2006.01)

(52) U.S. Cl.
CPC ............. *H01Q 1/005* (2013.01); *H01Q 1/246* (2013.01); *H01Q 1/42* (2013.01)

(58) Field of Classification Search
CPC ........... H01Q 1/005; H01Q 1/246; H01Q 1/42
See application file for complete search history.

(56) References Cited

U.S. PATENT DOCUMENTS

2004/0258485 A1 12/2004 Steinkamp et al.
2018/0287251 A1 10/2018 Proshold et al.
2023/0035855 A1* 2/2023 Zhang ...................... H01Q 1/42

FOREIGN PATENT DOCUMENTS

JP 2010081197 A 4/2010
KR 200359440 Y1 8/2004
KR 100808791 B1 3/2008
WO 2017165512 A1 9/2017

OTHER PUBLICATIONS

International Preliminary Report on Patentability corresponding to PCT/2021/026955; issued Nov. 10, 2022.
International Search Report and Written Opinion corresponding to PCT/2021/026955; mailed Jul. 30, 2021.

* cited by examiner

*Primary Examiner* — Robert Karacsony
(74) *Attorney, Agent, or Firm* — Myers Bigel. P.A.

(57) ABSTRACT

A reduced wind load antenna includes: a radome having front, rear, and side surfaces; upper and lower end caps attached to upper and lower ends of the radome to define an internal cavity; and radiating elements positioned within the internal cavity and configured to transmit and receive radio frequency (RF) signals. The antenna includes at least one airflow separation delaying feature selected from the group consisting of: large radiused corners on the lower end cap; a domed upper end cap; a domed lower end cap; a plurality of protuberances on the front surface; a plurality of protuberances on each of the side surfaces; spiral ridges on the front surface; and a continuous protuberance on each of the side surfaces.

11 Claims, 25 Drawing Sheets

LOW WIND-LOAD ANTENNA

RELATED APPLICATIONS

The present application is a continuation of U.S. patent application Ser. No. 17/231,447, filed Apr. 15, 2021, which claims priority from and the benefit of U.S. Provisional Patent Application Nos. 63/018,626, filed May 1, 2020, and 63/073,070, filed Sep. 1, 2020, the disclosures of which are hereby incorporated herein by reference in full.

FIELD OF THE INVENTION

The present invention relates generally to antennas, and more particularly to antennas mounted on an antenna tower, monopole, building or other structure that may be subject to wind loads.

BACKGROUND

With increased demand for more wireless communication, the number of radio and antenna units that a tower traditionally supports has increased and is expected to continue to increase. New towers will need to be designed to support greater numbers of antenna and radio units, while existing towers are retrofitted to support more units, and effort is made to fully utilize space available on the towers.

In addition, antennas are becoming larger in order to handle more wireless traffic. One parameter that influences antenna design is Effective Projected Area (EPA), which is determined by calculations defined by TIA/ANSI-222-H. EPA is intended to predict the effect of wind loading on an antenna and its mounting structure to enable designers to create a safe design. The configuration of the antenna itself can impact the calculations. As such, minimizing an antenna's contribution to EPA can be desirable.

SUMMARY

As a first aspect, embodiments of the invention are directed to a reduced wind load antenna. The antenna comprises: a radome having front, rear, and side surfaces; upper and lower end caps attached to upper and lower ends of the radome to define an internal cavity; and radiating elements positioned within the internal cavity and configured to transmit and receive radio frequency (RF) signals. The antenna includes at least one airflow separation delaying feature selected from the group consisting of: large radiused corners on the lower end cap; a domed upper end cap; a domed lower end cap; a plurality of protuberances on the front surface; a plurality of protuberances on each of the side surfaces; spiral ridges on the front surface; and a continuous protuberance on each of the side surfaces.

As a second aspect, embodiments of the invention are directed to a reduced wind load antenna comprising: a radome having front, rear, and side surfaces; upper and lower end caps attached to upper and lower ends of the radome to define an internal cavity; and radiating elements positioned within the internal cavity and configured to transmit and receive radio frequency (RF) signals. The radome includes a continuous elongate protuberance on each of the side surfaces.

As a third aspect, embodiments of the invention are directed to a reduced wind load antenna comprising: a radome having front, rear, and side surfaces; upper and lower end caps attached to upper and lower ends of the radome to define an internal cavity; and radiating elements positioned within the internal cavity and configured to transmit and receive radio frequency (RF) signals. The radome includes a plurality of protuberances on each of the side surfaces.

DETAILED DESCRIPTION

Figure 1:
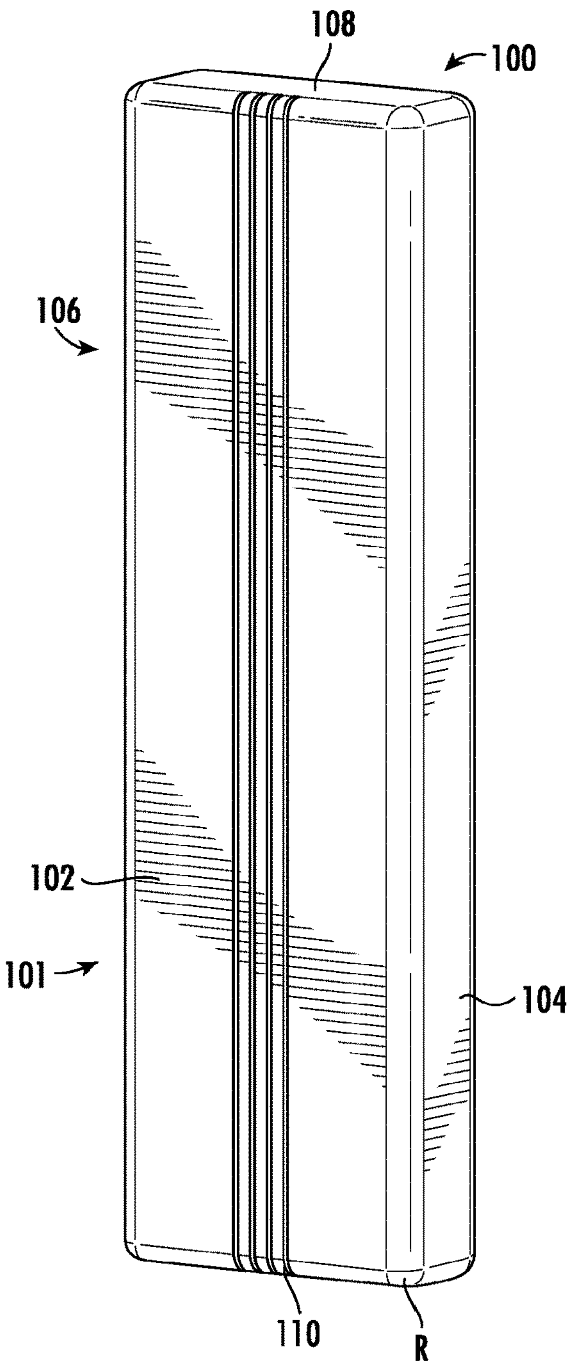
FIG. 1 is a perspective view of an antenna according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1A:
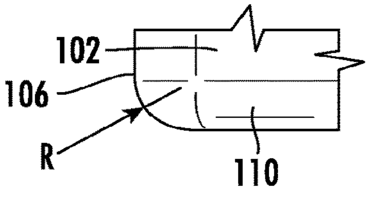
FIG. 1A is a greatly enlarged partial front view of the lower end of the antenna of FIG. 1.

Referring now to FIGS. 1 and 1A, an antenna according to embodiments of the invention and designated broadly at 100 is shown therein. The antenna 100 is generally elongate and is covered by a radome 101 that includes a front surface 102 and side surfaces 104, 106, and is further covered by top and bottom end caps 108, 110. In some instances the radome 101 and end caps 108, 110 may comprise a single monolithic component, whereas in other embodiments the radome 101 and end caps 108, 110 may comprise separate pieces.

The antenna 100 houses internal antenna components, such as radiating elements, a reflector, phase shifters, diplexers, remote electronic tilt actuators, cables, a controller and the like, that enable the antenna 100 to transmit and receive radio frequency (RF) signals. Exemplary antenna components are described in, for example, PCT Publication No. WO 2017/165512 A1, the disclosure of which is hereby incorporated herein by reference. The antenna 100 also includes connectors (not shown in FIG. 1A, but visible, for example, in FIGS. 24A-28C) that enable the antenna 100 to be connected with one or more radios for the transmission and reception of RF signals, and with other associated telecommunications equipment.

The antenna 100 is typically mounted well above the ground for optimal transmission. As such, it may be subjected to high (and in some cases virtually unimpeded) wind loads. Thus, design elements of the antenna 100, and in particular of the radome 101 and end caps 108, 110, may impact the overall wind load experienced by the antenna 100.

Figure 10:
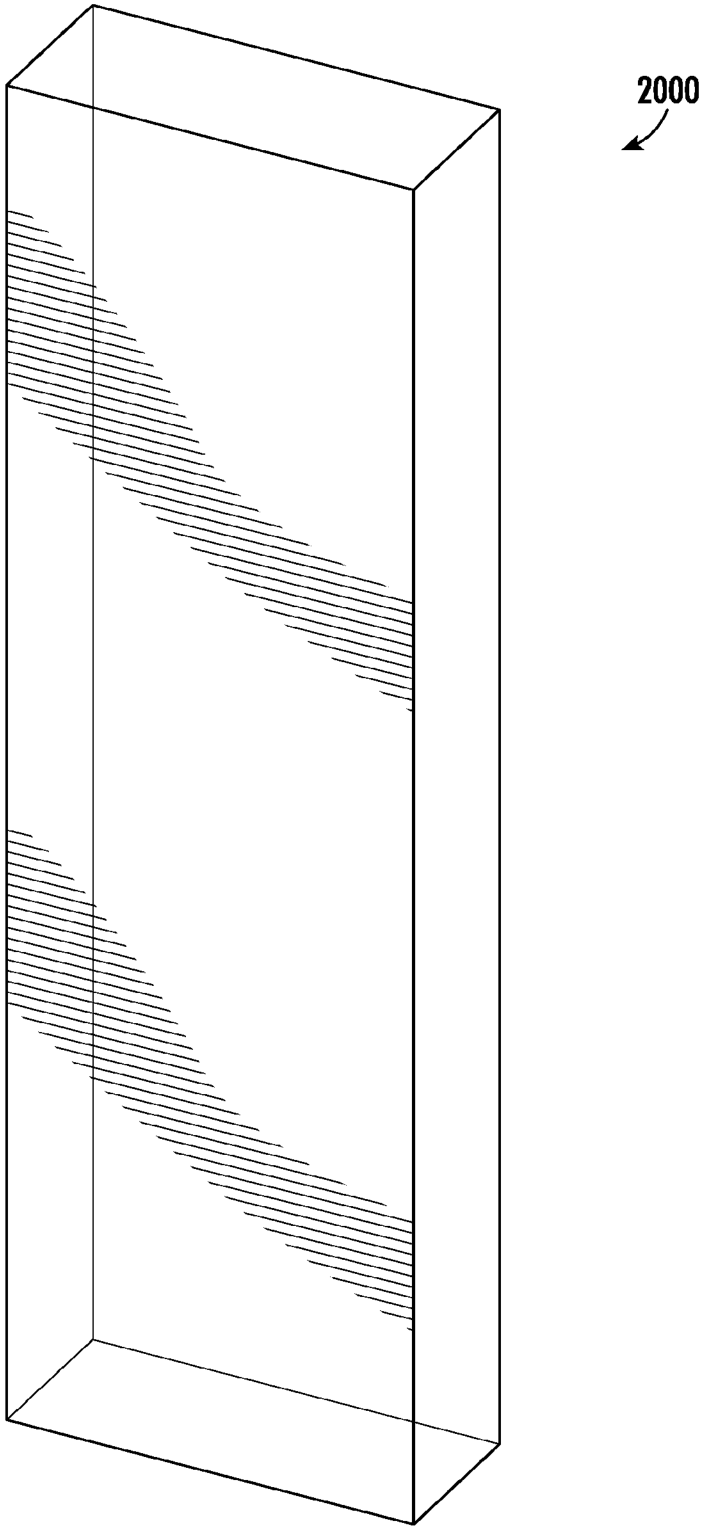
FIG. 10 is a front perspective view of a conventional antenna that is used as a baseline for comparisons with the antennas of FIGS. 1-8A.

One example of a design element that can reduce wind loading is emphasized in FIG. 1A. In FIG. 1A, the lower end cap 110 is shown as having a large corner radius R. As used herein, the term "corner radius" is intended to indicate that the radius is three-dimensional, in that it exists along all three of the x-y-z axes present at the corner of the lower end cap 110, and a "large corner radius" is a corner radius that exceeds 20 mm. In some instances, the large corner radius R may be between about 20 and 50 mm, with a large radius R of between about 25 and 35 mm being employed in some embodiments. The presence of the large corner radius R at the corners of the end caps 108, 110 can reduce the frontal wind load experienced by the antenna 100 compared to a similar "baseline" antenna 2000 (see FIG. 10) that lacks the rounded corners on the end caps. (The dimensions in millimeters of the antenna 2000 are shown in FIG. 10).

Figure 2:
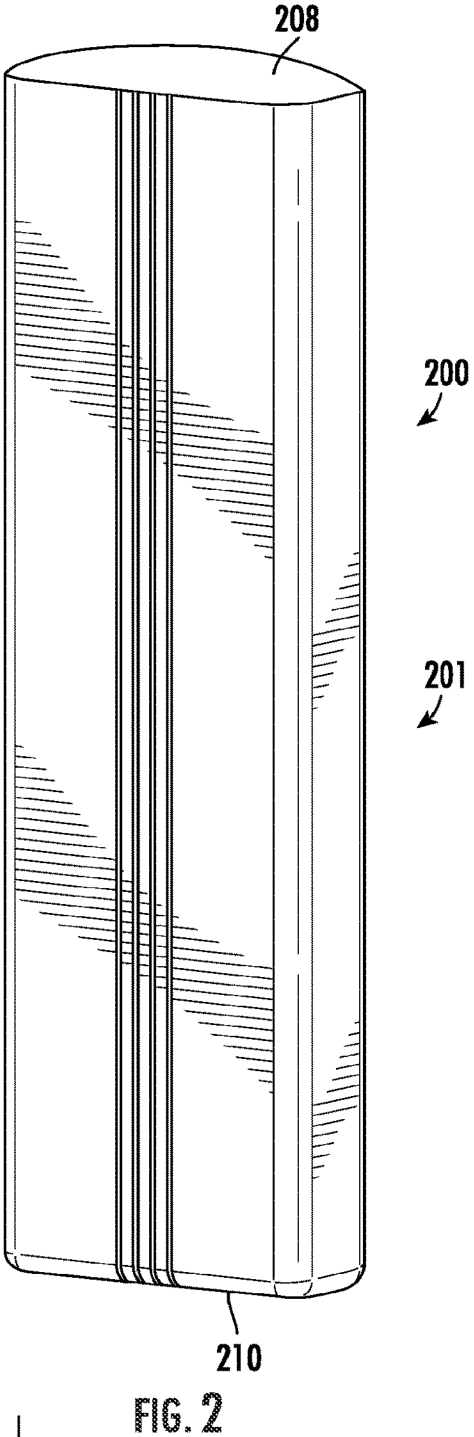
FIG. 2 is a perspective view of an antenna according to other embodiments of the invention.
Figure 2A:
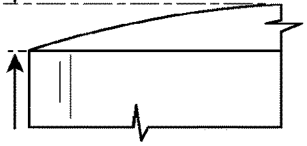
FIG. 2A is a greatly enlarged partial front view of the domed end cap of the antenna of FIG. 2.

Referring now to FIGS. 2 and 2A, an antenna 200 having a radome 201 and end caps 208, 210 is shown therein. The antenna 202 is similar to the antenna 100 with the exception that, as shown in FIG. 2A, the top end cap 208 is "domed"

with a shallow radius of curvature. For a typical antenna, the radius of curvature may be between about 500 and 900 mm, which can produce a "dome" that extends upwardly between about 30 and 50 mm farther than a flat end cap. The presence of the domed top end cap 208 can add to the overall length of the antenna 200, but the contour of the top end cap 208 can still help to reduce the frontal wind load experienced by the overall antenna 200 compared to the antenna 2000 (FIG. 10), which lacks a domed top end cap.

It will be understood that the "dome" on the end caps 208,210 may be formed integrally with/into the original end cap, or may be added to an existing end cap.

Figure 3:
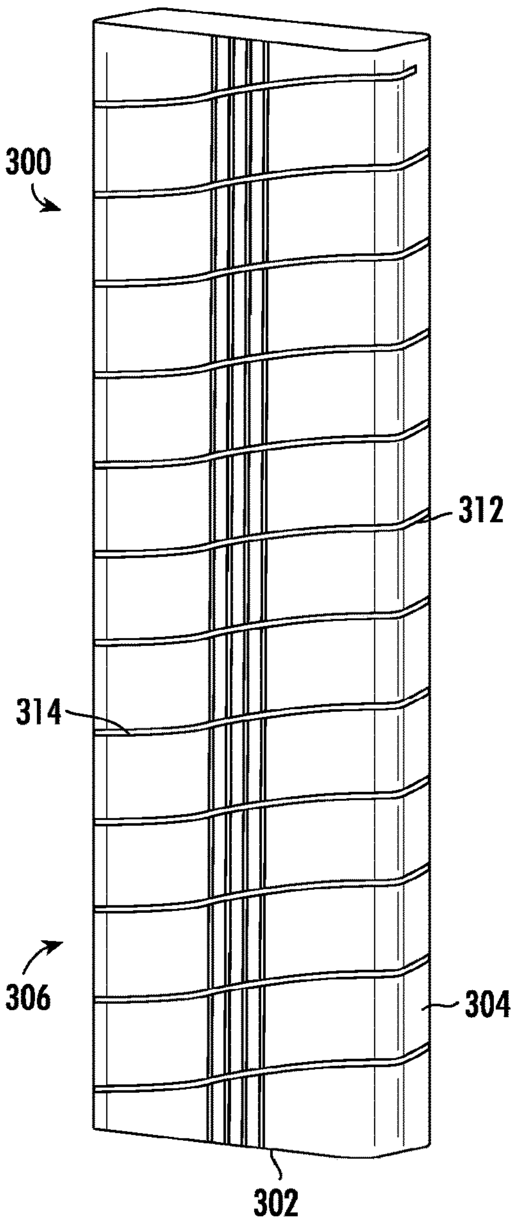
FIG. 3 is a perspective view of an antenna according to additional embodiments of the invention.
Figure 3A:
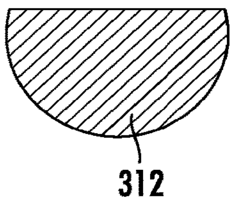
FIG. 3A is a section view of the filament wrapped around the antenna of FIG. 3.

Referring now to FIGS. 3 and 3A, another antenna, designated broadly at 300, is shown therein. The antenna 300 is similar to the antenna 2000, but includes a spiral filament 312 wrapped helically around its periphery. As can be seen in FIG. 3, the spiral filament 312 can be wrapped around the antenna 300 such that it defines a series of slanted or sloped ridges 314 across the front surface 302 and side surfaces 304, 306 of the radome 301.

In some embodiments, the ridges 314 may be disposed at an angle α of between about 10 and 30 degrees relative to horizontal (i.e., relative to the width of the antenna 300). In some embodiments, the ridges 314 may extend between about 3 and 15 mm from the surface of the radome 301 As can be seen in FIG. 3A, the filament 312 may be of generally semicircular cross-section, and may be wrapped in a helical pattern around the antenna with a pitch of about 150 mm along the longitudinal axis of the antenna 300. The inclusion of the spiral ridges 314 can reduce the wind load experienced by the antenna 300 compared to the baseline antenna 2000 (FIG. 10), which lacks the ridges 314.

It will be understood that the ridges 314 may be formed into the surface of the radome 301 at manufacture, either integrally or with a separate component (such as a filament), or may be added to an existing radome. Those of skill in this art will also appreciate that the ridges 314 may be formed as a "double" helix, a "triple" helix, etc., and also may be formed as annular features.

Figure 4:
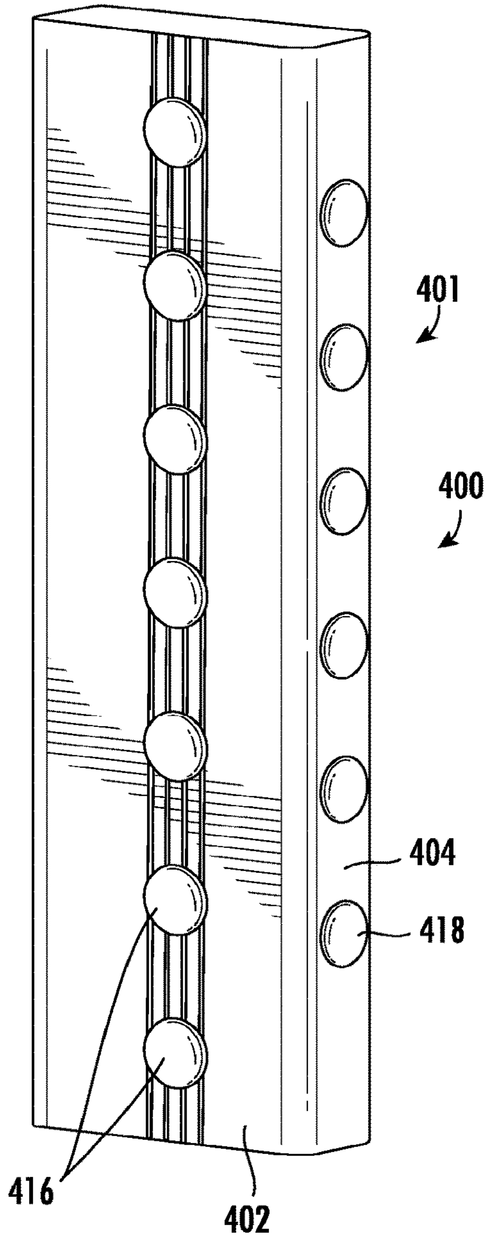
FIG. 4 is a perspective view of an antenna according to further embodiments of the invention.
Figure 4A:
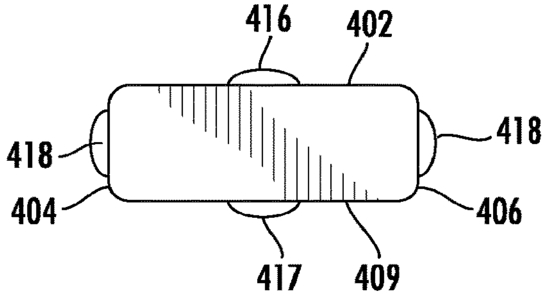
FIG. 4A is a top section view of the antenna of FIG. 4.

Referring now to FIGS. 4 and 4A, another antenna, designated broadly at 400, is shown therein. The antenna 400 is similar to the baseline antenna 2000 of FIG. 10, but includes domed protuberances 416 on the front surface 402 of the radome 401, domed protuberances 417 on the side surfaces 404, 406, and domed protuberances 418 on the rear surface 409. In the illustrated embodiment, there are seven protuberances 416 on the front surface 402, seven protuberances 417 on the rear surface 409, and six protuberances 417 on the side surfaces 404, 406, but the number and placement of any of the protuberances 416, 417, 418 may vary. The inclusion of the domed protuberances can reduce the frontal wind load on the antenna 400 compared with the antenna 2000.

In some embodiments, the height of the protuberances from their underlying surfaces may vary; for example, the protuberances 416 may extend between about 25 and 35 mm away from the front surface 402, the protuberances 417 may extend between about 20 and 30 mm away from the rear surface 409, and the protuberances 418 may extend between about 15 and 25 mm away from the side surfaces 406, 408. At the base (i.e., the diameter), the protuberances 416, 417, 418 may be between about 100 and 150 mm. The protuberances 416, 417 may extend laterally over only a small fraction of the width of the radome 401 (e.g., 10 to 25 percent), whereas the protuberances 418 on the side surfaces 404, 406 may extend over a much larger fraction of the depth of the radome 401 (e.g., 50 to 75 percent).

It will be understood that any or all of the protuberances 416, 417, 418 may be formed with the radome during manufacture (either integrally or as separate components), or may be added to an existing radome.

Figure 5:
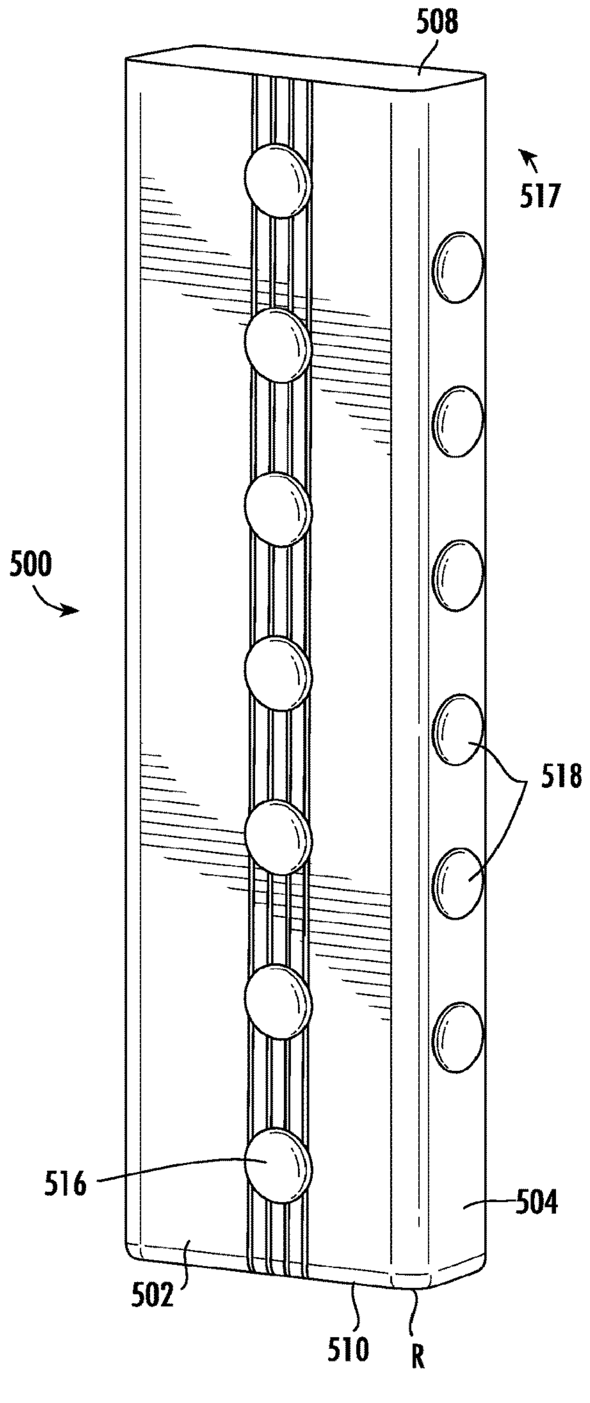
FIG. 5 is a perspective view of an antenna according to still further embodiments of the invention.

It will be understood that various of the design elements discussed above may be combined in a single antenna. For example, FIG. 5 illustrates an antenna 500 that includes domed protuberances 516, 517, 518 as shown in FIG. 4 a domed top end cap 508, and a large corner radius R on its bottom end cap 510. Wind loading simulations indicate that this combination of features can reduce the overall frontal wind load experienced by the antenna 500.

Figure 6:
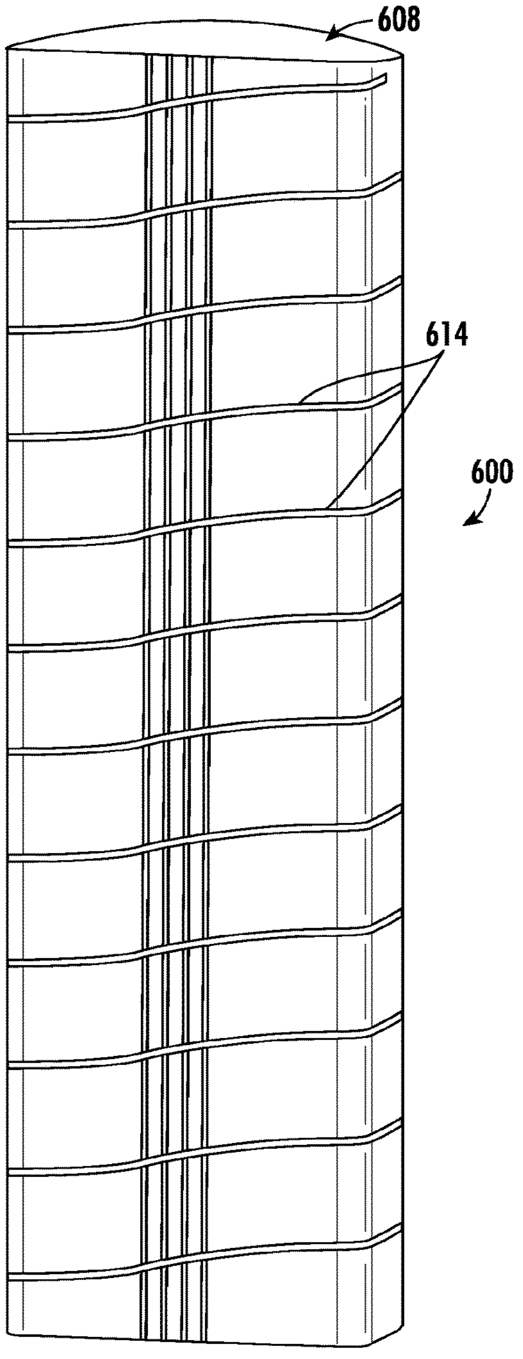
FIG. 6 is a perspective view of an antenna according to further embodiments of the invention.

As another example, FIG. 6 illustrates an antenna 600 that includes a domed top end cap 608 and spiral ridges 614 as are discussed in connection with the antenna 300. Wind loading simulations have shown that this combination of features can reduce the frontal wind load experienced by the antenna 600.

Figure 7:
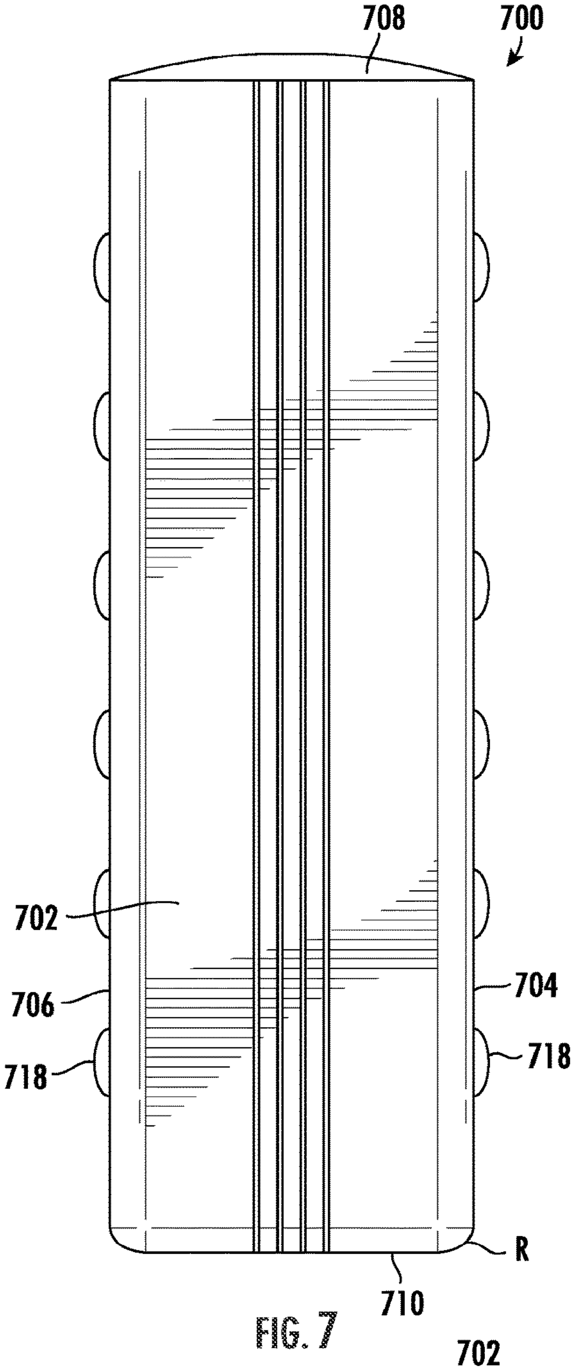
FIG. 7 is a front view of an antenna according to even further embodiments of the invention.
Figure 7A:
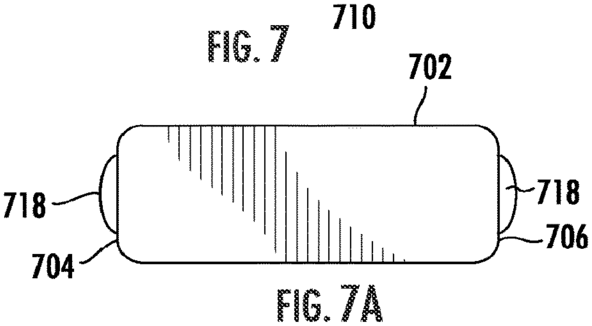
FIG. 7A is a top section view of the antenna of FIG. 7.

As still another example, FIGS. 7 and 7A illustrate an antenna 700 that includes a domed top end cap 708, a bottom end cap 710 with large corner radii R, and domed protuberances 718 on its side surfaces 704, 706, but no protuberances on the front surface 702. Wind loading simulations indicate that this combination of features can reduce the overall frontal wind load experienced by the antenna 700.

Figure 8:
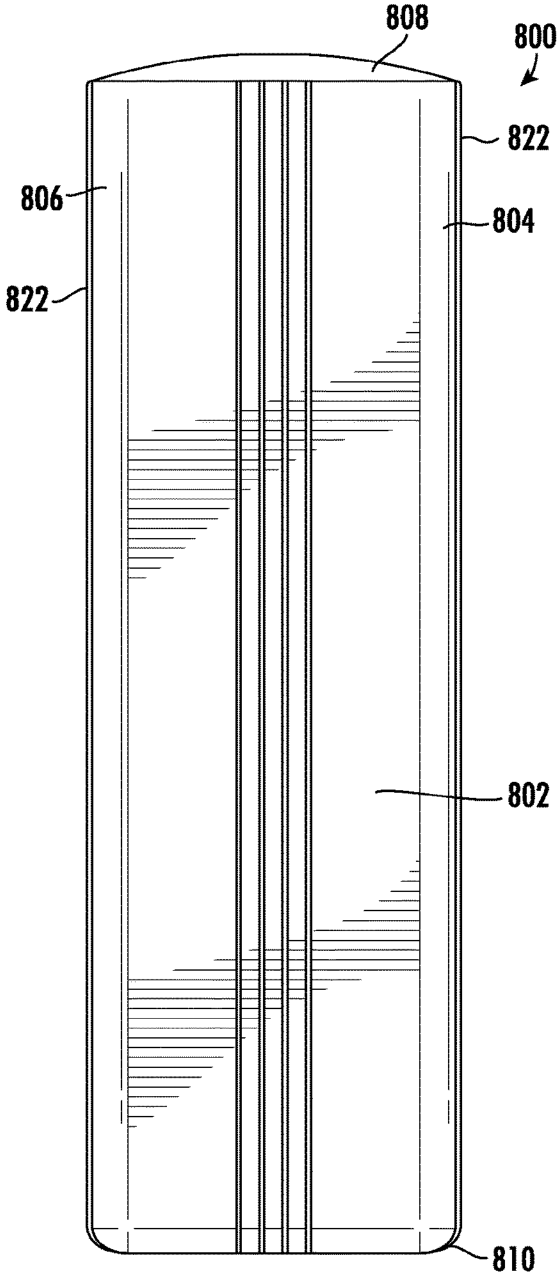
FIG. 8 is a front view of an antenna according to still further embodiments of the invention.
Figure 8A:
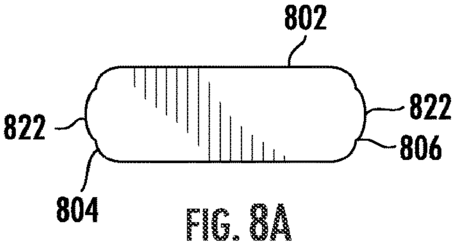
FIG. 8A is a top section view of the antenna of FIG. 8.

As a still further example, FIGS. 8 and 8A illustrate an antenna 800 that includes a domed top end cap 808 and a bottom end cap 810 that has large corner radii R, but also includes elongated protuberances 822 on its side surfaces 704, 706. The elongated protuberances 822 may extend continuously along the side surfaces 804, 806 for much, if not all of the height of the antenna 800. The elongate protuberances 822 may be smaller in front-to-back dimension than the protuberances discussed in connection with the antenna 400 (e.g., between about 40 and 60 percent of the depth, or about 75 to 125 mm) and may extend a shorter distance away from the side surfaces 804, 806 (e.g., 10 to 20 mm, or about between about 2 to 5 percent of the width of the antenna). As a specific example, the elongate protuberances 822 may extend about 15 mm from the side surfaces 804, 806, and may be only about 100 mm in front-to-back dimension. This combination of features can provide the antenna 800 with a lower frontal wind loading in simulations.

It may also be appreciated that a radome may include elongate continuous protuberances like those discussed above on the front surface, and/or may include protuberances that provide the front surface with a stepped profile. Also, in some embodiments the sides may include elongate recesses rather than protuberances. Further, if elongate protuberances 822 are to be included, they may be added to an existing antenna.

Figure 9:
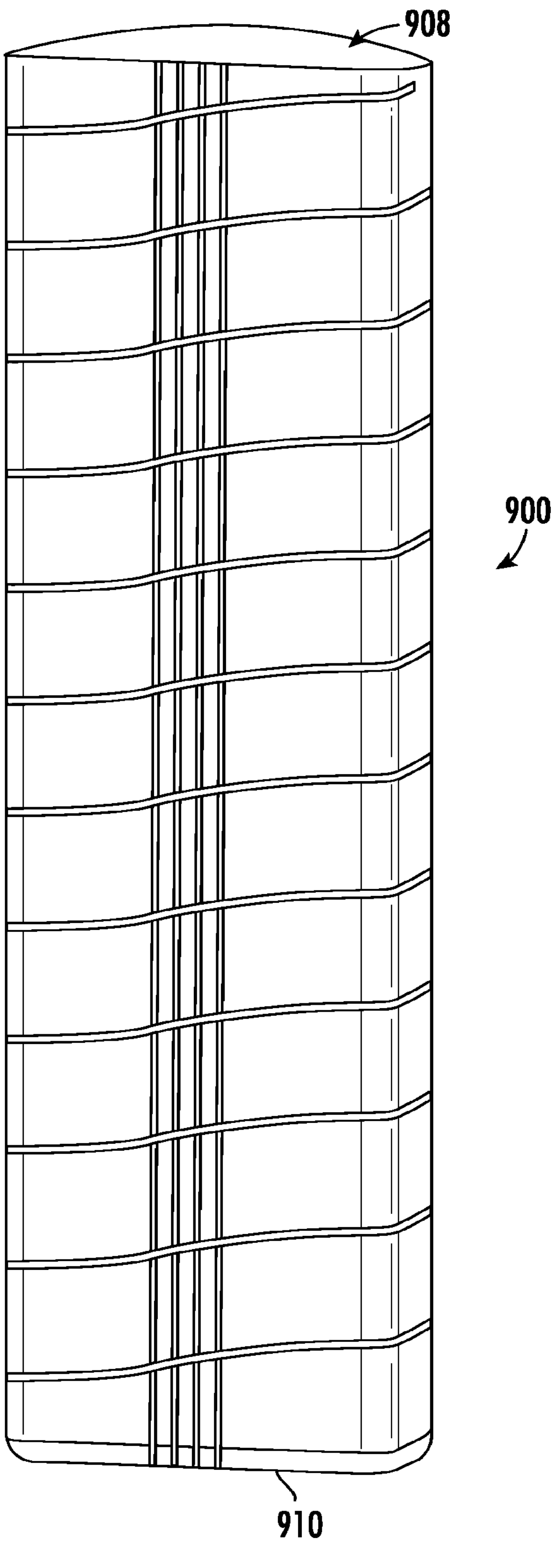
FIG. 9 is a front view of an antenna cording to further embodiments of the invention.

As an additional example, an antenna 900 illustrated in FIG. 9 has spiral ridges 914 and large corner radii R on its bottom end cap 910 as well as a domed top end cap 908.

As further examples of features that may reduce wind loading, in some embodiments elements that change shape under wind load (e.g., are deflected, compressed, stretched, etc.) may be included. These may be particularly useful if the shape changes differently based on the wind direction.

The invention will now be described in greater detail in the following, non-limiting examples.

Example 1

Figure 11:
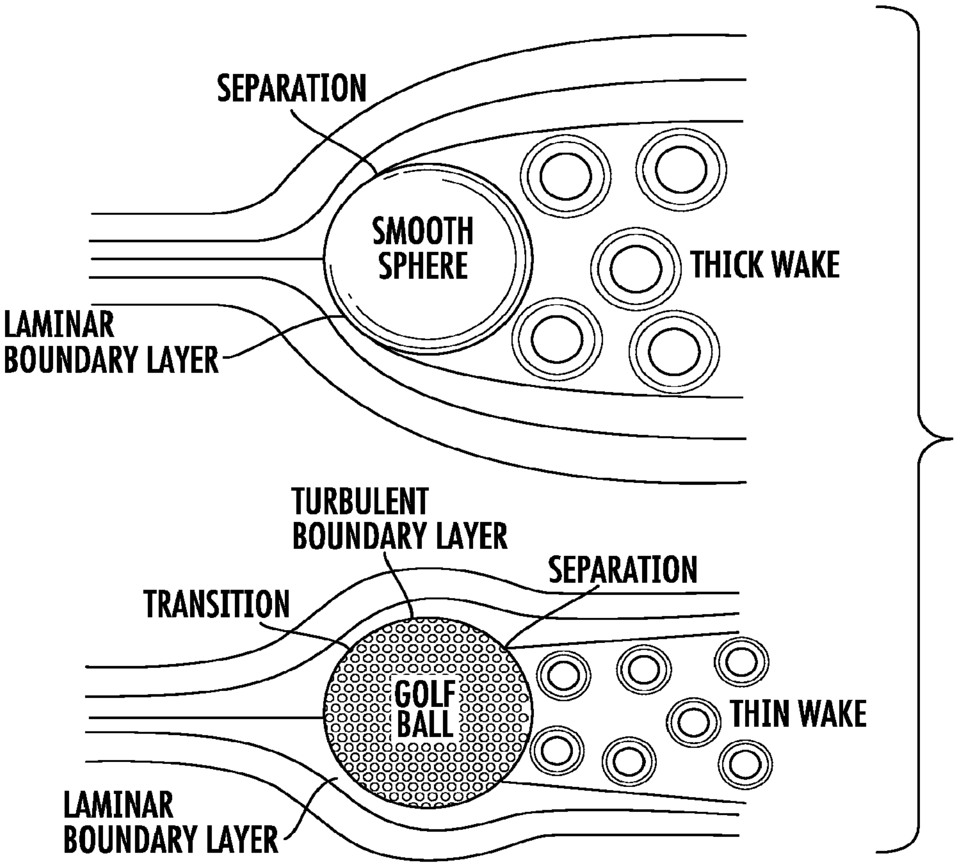
FIG. 11 is a schematic depiction of the phenomenon of delayed flow separation as experienced by a golf ball.
Figure 12:
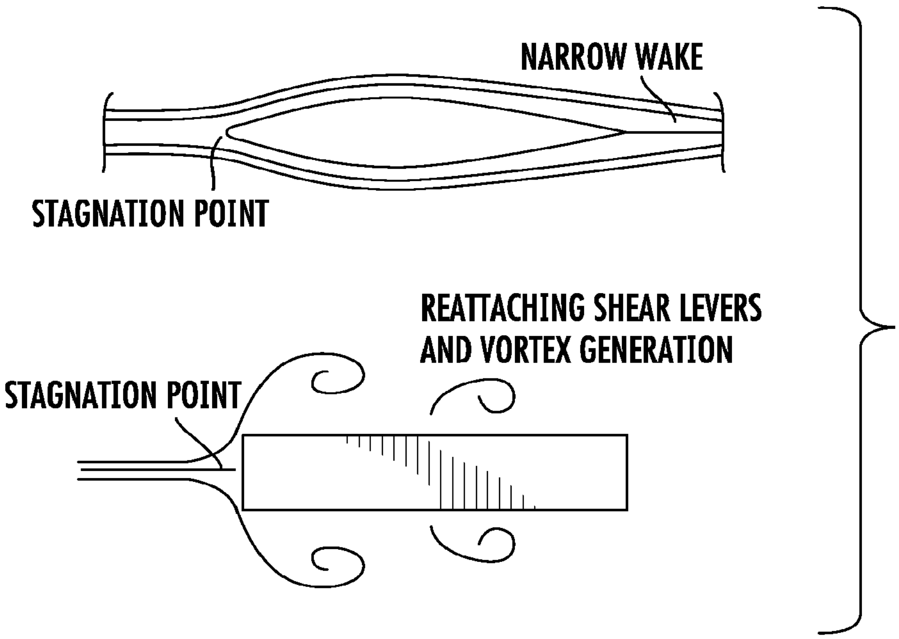
FIG. 12 is a schematic depiction of the phenomenon of delayed flow separation as experienced by an airfoil.

The different design features described above as reducing wind loading may impact the "flow separation" properties of the antennas. Flow separation occurs when the boundary layer of a fluid stream on an object travels far enough against an adverse pressure gradient that the speed of the boundary layer relative to the object falls almost to zero. The fluid flow becomes detached from the surface of the object, and instead takes the forms of eddies and vortices. In aerodynamics, flow separation can often result in increased drag, particularly pressure drag, which is caused by the pressure differential between the front and rear surfaces of the object as it travels through the air (or as air travels past the object). Common examples of this phenomenon are golf balls (FIG. 11) and airfoils (FIG. 12). Aerodynamic surfaces with delayed flow separation that keep the local flow attached for as long as possible are typically desirable for reduced wind load on an object.

Simulations of wind loading on antenna designs was conducted on several of the various designs described above, in which the results were compared to the baseline antenna 2000 depicted in FIG. 10. As shown in FIG. 10, the antenna 2000 was 1828 mm in length, 498 mm in width, and 197 mm in depth. The antenna 2000 has none of the design features described above for potentially reducing wind loading (i.e., large corner radii, domed end caps, or protuberances on the front or sides).

The wind loading simulations included frontal loading (i.e., the wind load applied normal to the front surface of the antenna), lateral loading (i.e., the wind load applied parallel to the front surface of the antenna), and 20 degree loading (i.e., the wind load applied at a 20 degree angle to the frontal wind load). For some of the simulations, only the frontal loading simulation was conducted. For others of the simulations, all three loading conditions were simulated.

In addition, the inclusion of a domed end cap (rather than a flat end cap as in the antenna 2000) can increase the overall length/height of the antenna by the magnitude to which the end cap's "dome" extends beyond the level of a conventional end cap. To address this, in some of the simulations, the results represent the recognition that there is additional length/height of the antenna (either 40 or 80 mm, depending on whether one or two domed end caps were included). In other simulations, it was assumed that the overall length/height of the antenna remained constant with that of the antenna 2000 (i.e., 1828 mm) even with one or more domed end caps. Thus, the simulations discussed below that include domed end caps also include a reference to the overall length/height of the antenna being simulated.

The results of the simulations are set forth in Table 1. The table identifies the antenna on which the simulation was conducted by the reference number used above, and includes an indication of the wind load-reducing features included on the antenna. The remainder of Table 1 sets forth the wind load experienced by each antenna for the given type of wind loading.

TABLE 1

| Antenna | Features/Dimensions | Frontal Load (N) | Lateral Load (N) | 20° Frontal Load (N) |
|---|---|---|---|---|
| 2000 | None | 877 | 108.4 | 770.2 |
| 100 | LCR | 806 | | |
| 200 (modified) | Top EC and Bottom EC (1908 mm length) | 798 | | |
| | Top EC and Bottom EC (1828 mm length) | 765 | | |
| 300 | Spiral | 816 | | |
| 400 | FP, RP and SP | 777 | | |

TABLE 1-continued

| Antenna | Features/Dimensions | Frontal Load (N) | Lateral Load (N) | 20° Frontal Load (N) |
|---|---|---|---|---|
| 500 | LCR, Top EC, FP, RP and SP (1868 mm length) | 720 | 105 | 674 |
| | LCR, Top EC, FP, RP and SP (1828 mm length) | 705 | | |
| 600 | Spiral, top EC (1868 mm length) | 703 | 108.6 | 751 |
| 700 | Top EC, SP, LCR (1868 mm length) | 729 | 108.5 | 674 |
| | Top EC, SP, LCR (1828 mm length) | 713 | | |
| 800 | Top EC, continuous SP (1868 mm length) | 663 | 103 | 666 |
| | Top EC, continuous SP (1828 mm length) | 649 | | |

Key to terms in Table 1.
Baseline antenna - 1828 mm × 430 mm × 197 mm
LCR: Large corner radius (29 mm)
EC: End cap with 40 mm "dome"
FP/SP/RP: Domed front/side/rear protuberances with heights of 30 mm (front) 25 mm (rear) and 20 mm (side)
Continuous SP: lengthwise continuous side protuberances with heights of 15 mm and depths of 99.5 mm.

Figure 13A:
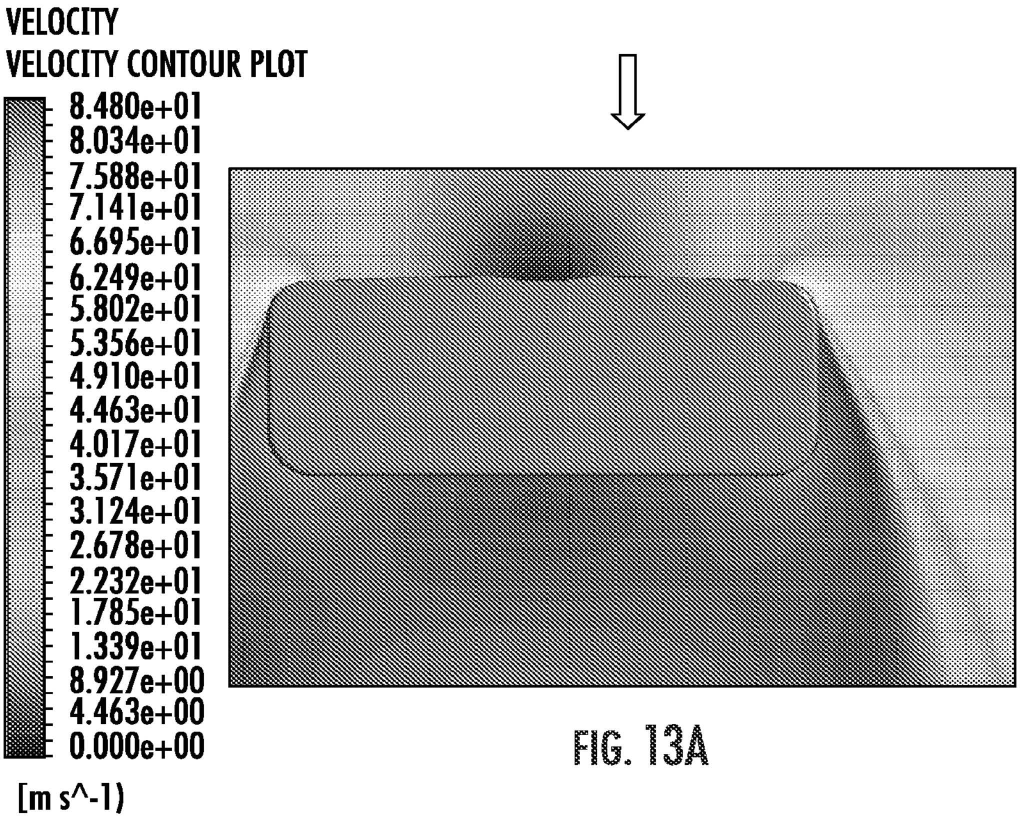
FIGS. 13A-C are comparisons of velocity contour plots for frontal wind loading of the antennas depicted in FIGS. 10, 3 and 4 (top mid-section view).
Figure 13B:
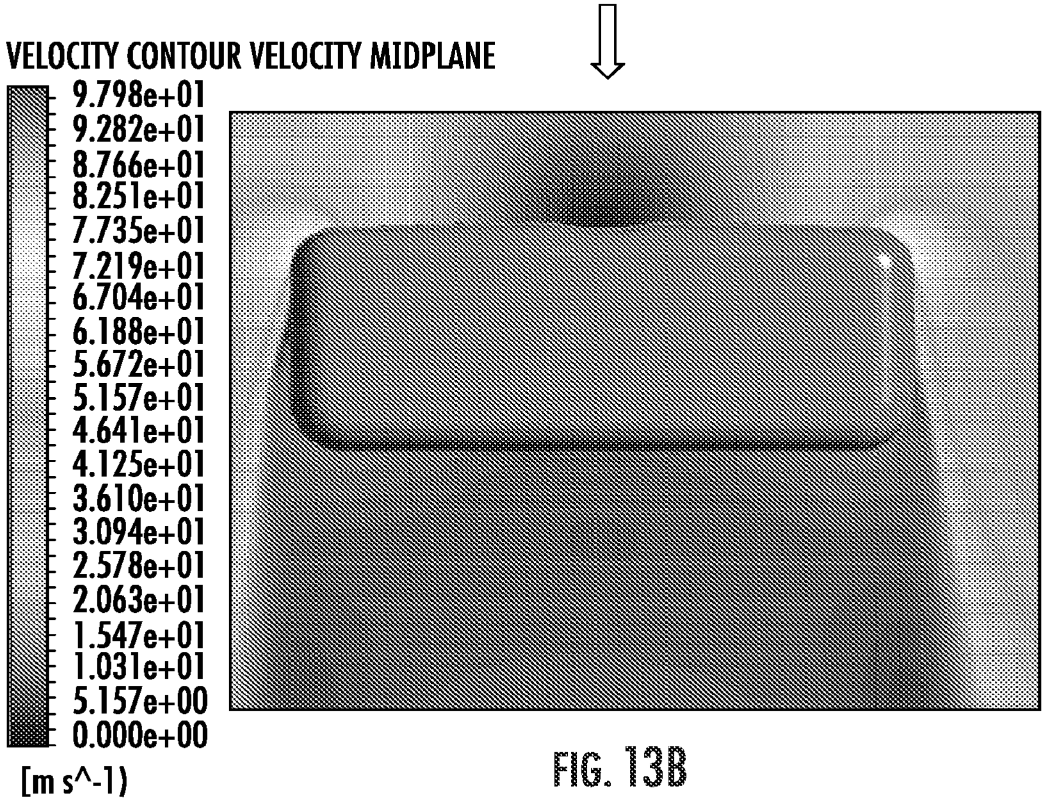
Figure 13C:
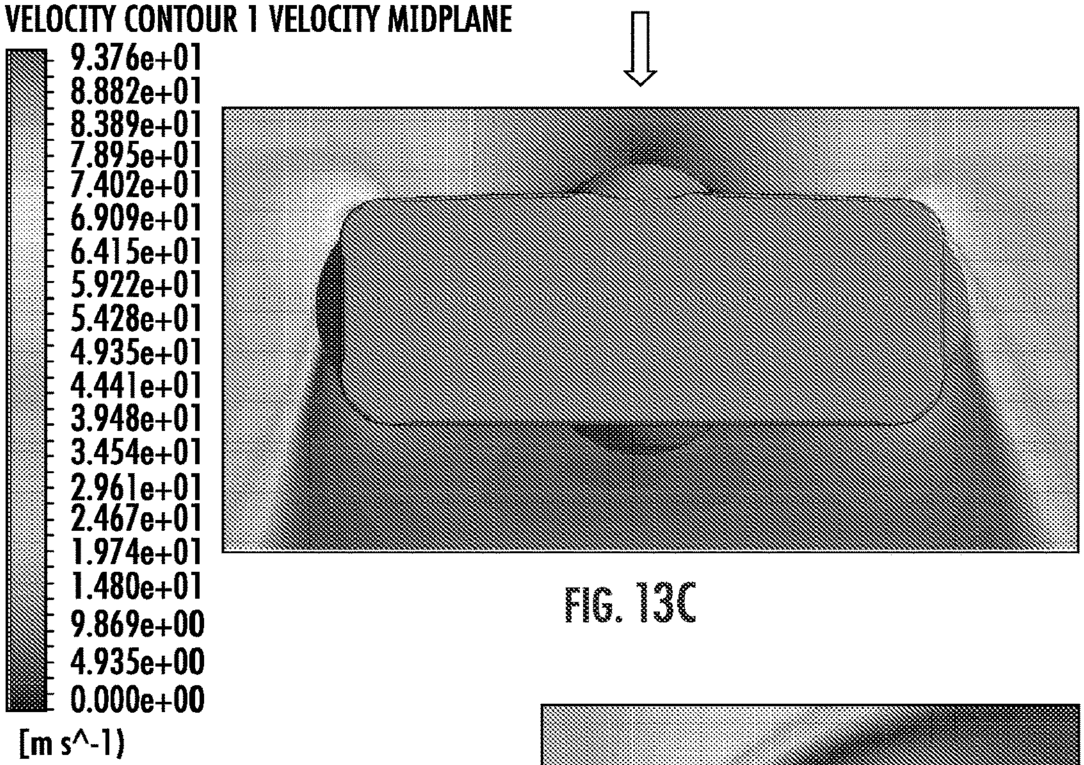
Figure 14A:
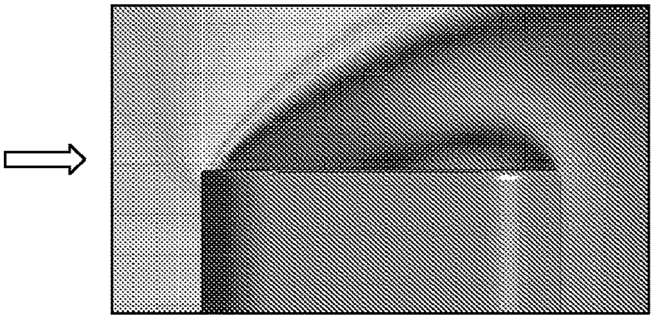
FIGS. 14A-C are comparisons of velocity contour plots for frontal wind loading of the antennas depicted in FIGS. 10, 2 and 3 (side view).
Figure 14B:
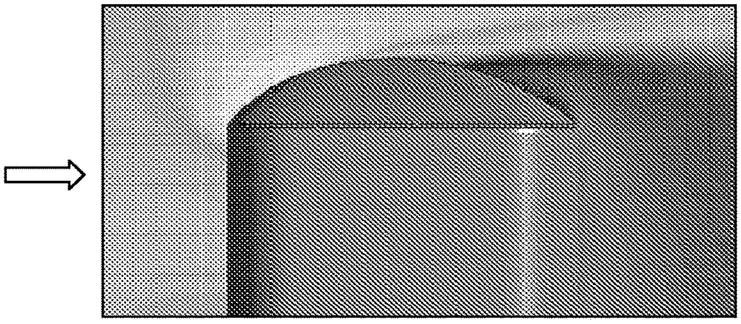
Figure 14C:
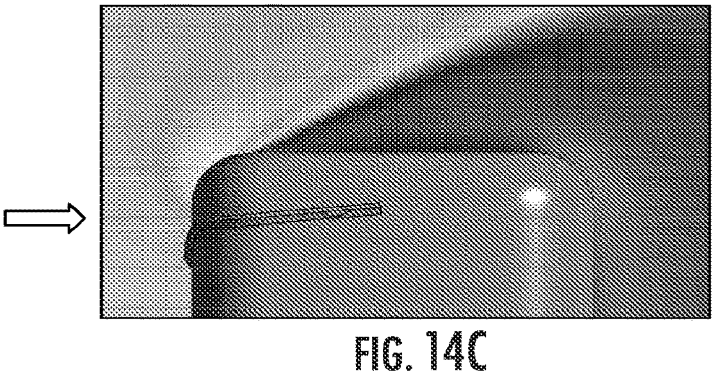
Figure 15A:
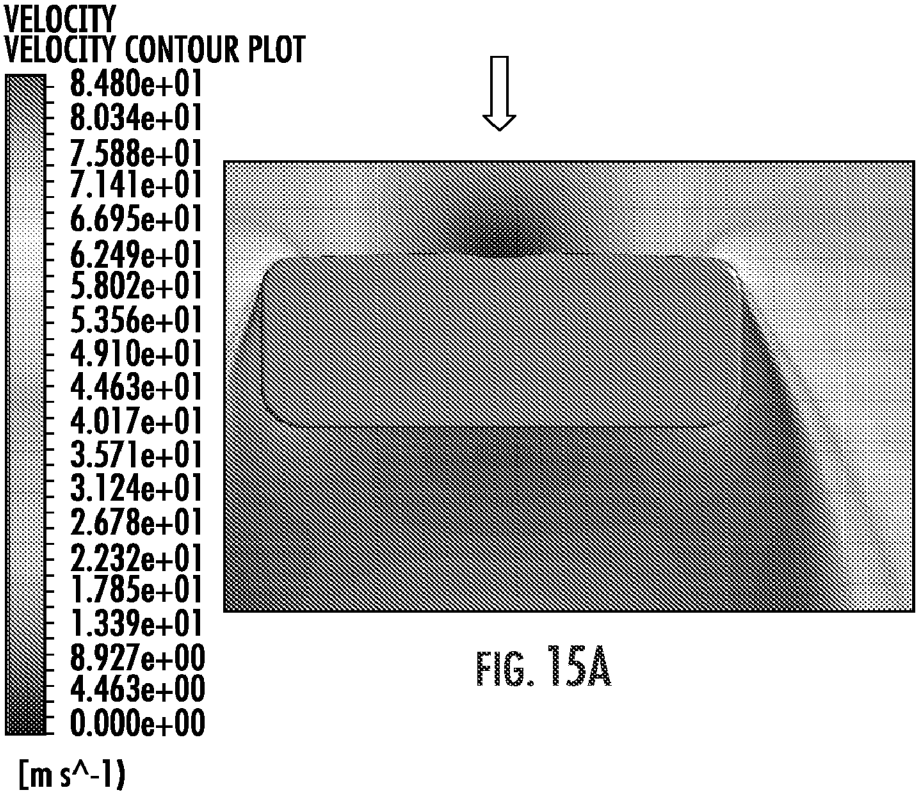
FIGS. 15A-C are comparisons of velocity contour plots for frontal wind loading of the antennas depicted in FIGS. 10, 6 and 5 (top view).
Figure 15B:
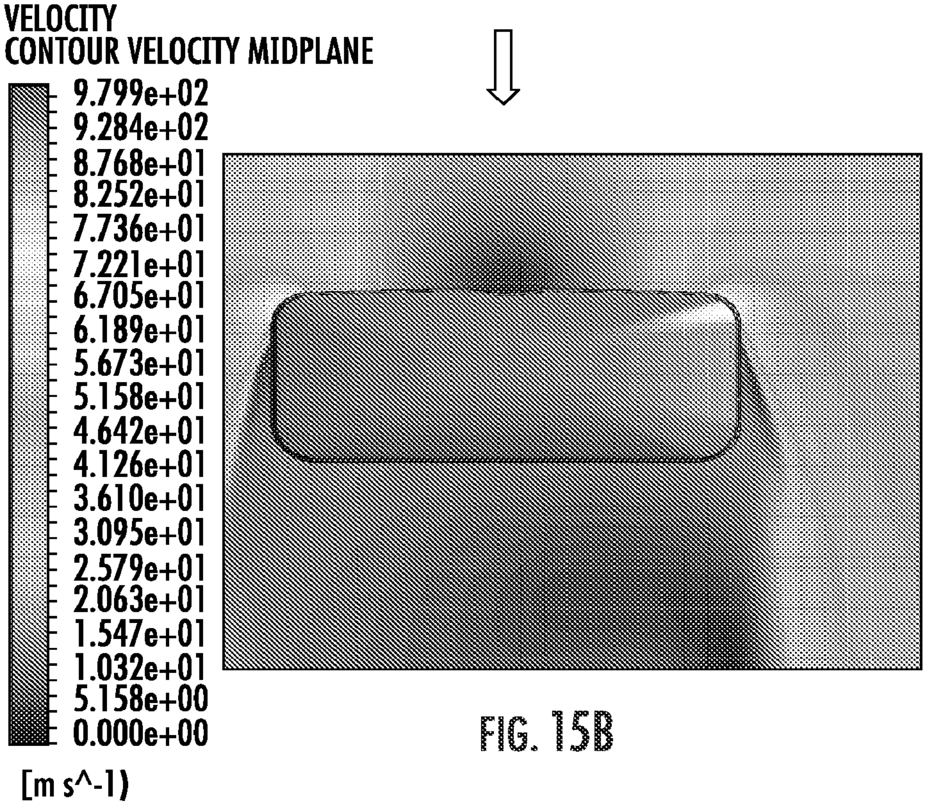
Figure 15C:
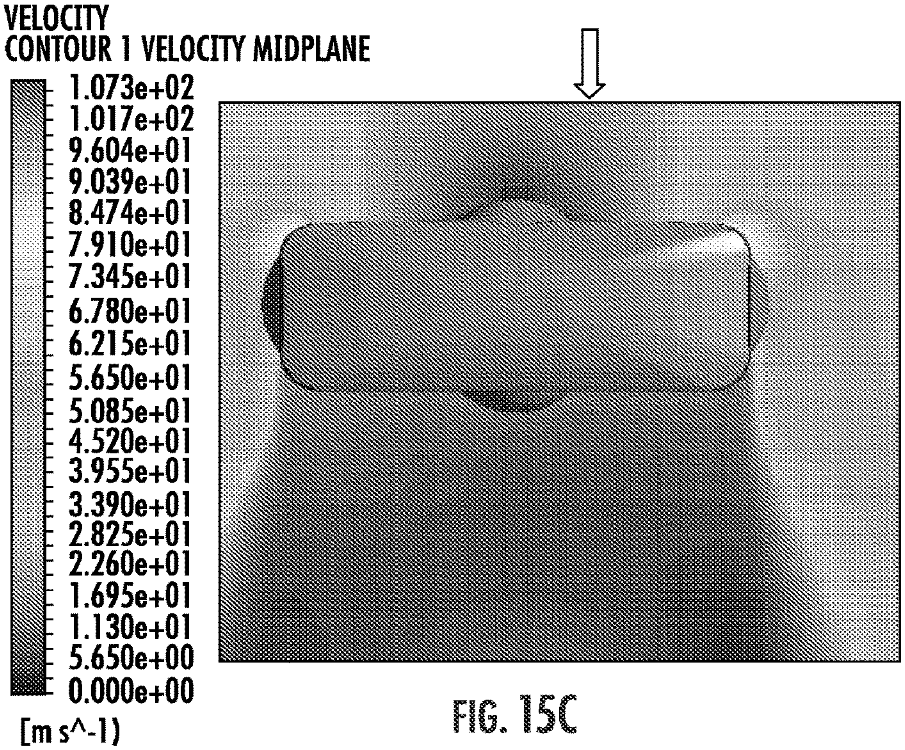
Figure 16A:
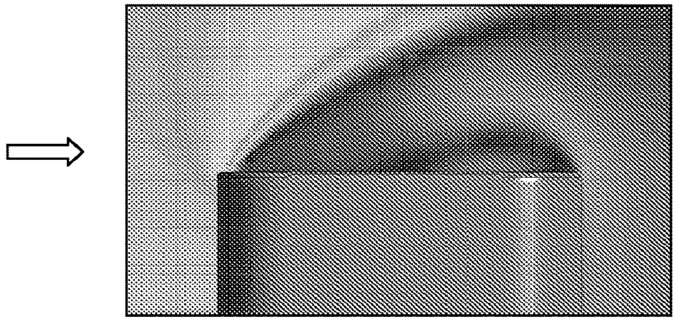
FIGS. 16A-C are comparisons of velocity contour plots for frontal wind loading of the antennas depicted in FIGS. 10, 6 and 5 (side view).
Figure 16B:
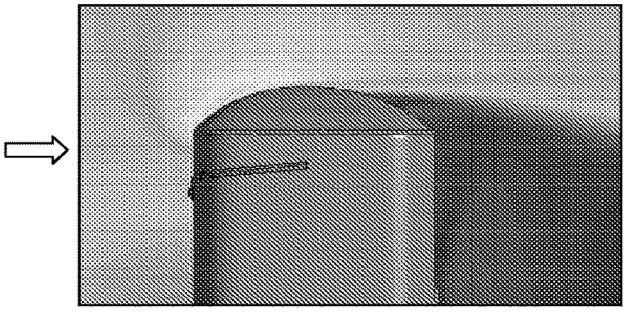
Figure 16C:
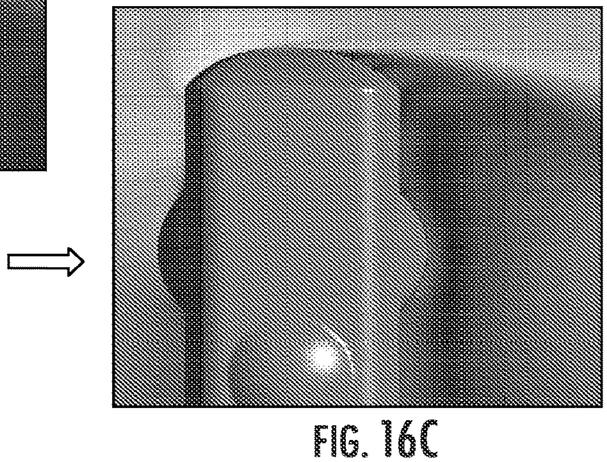
Figure 17A:
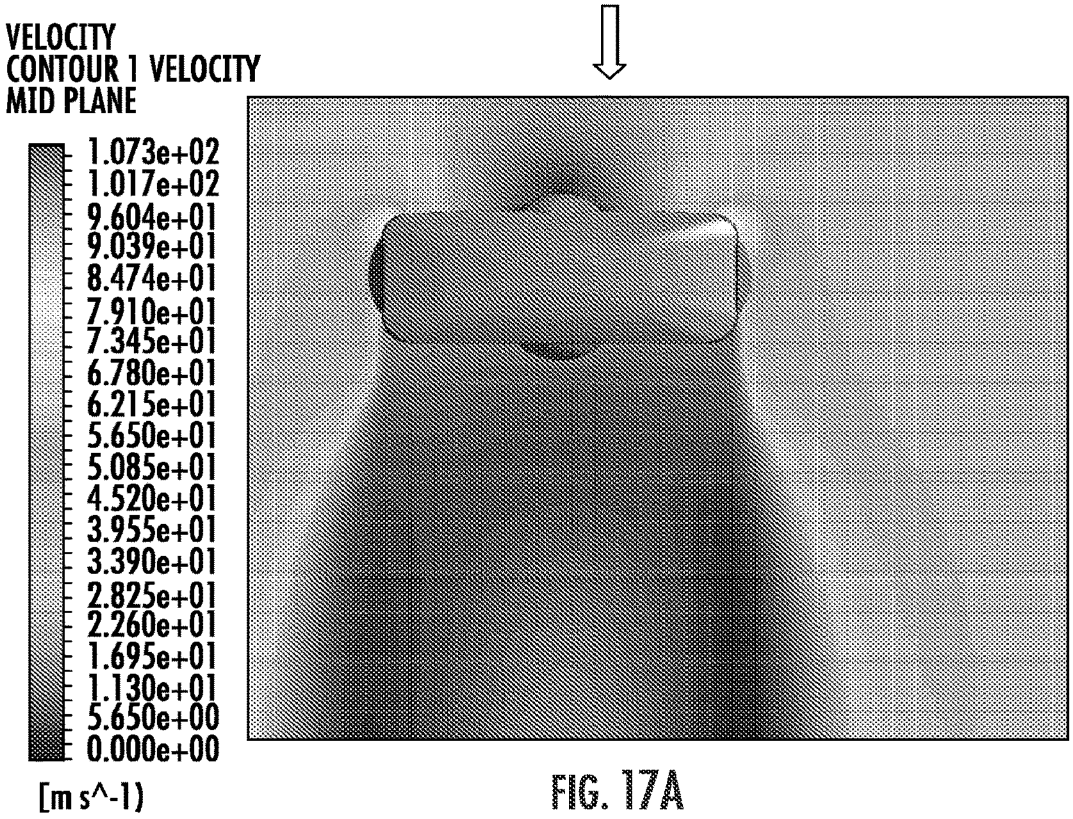
FIGS. 17A-B show top and side views, respectively, of velocity contour plots for frontal wind loading of the antenna depicted in FIG. 5.
Figure 17B:
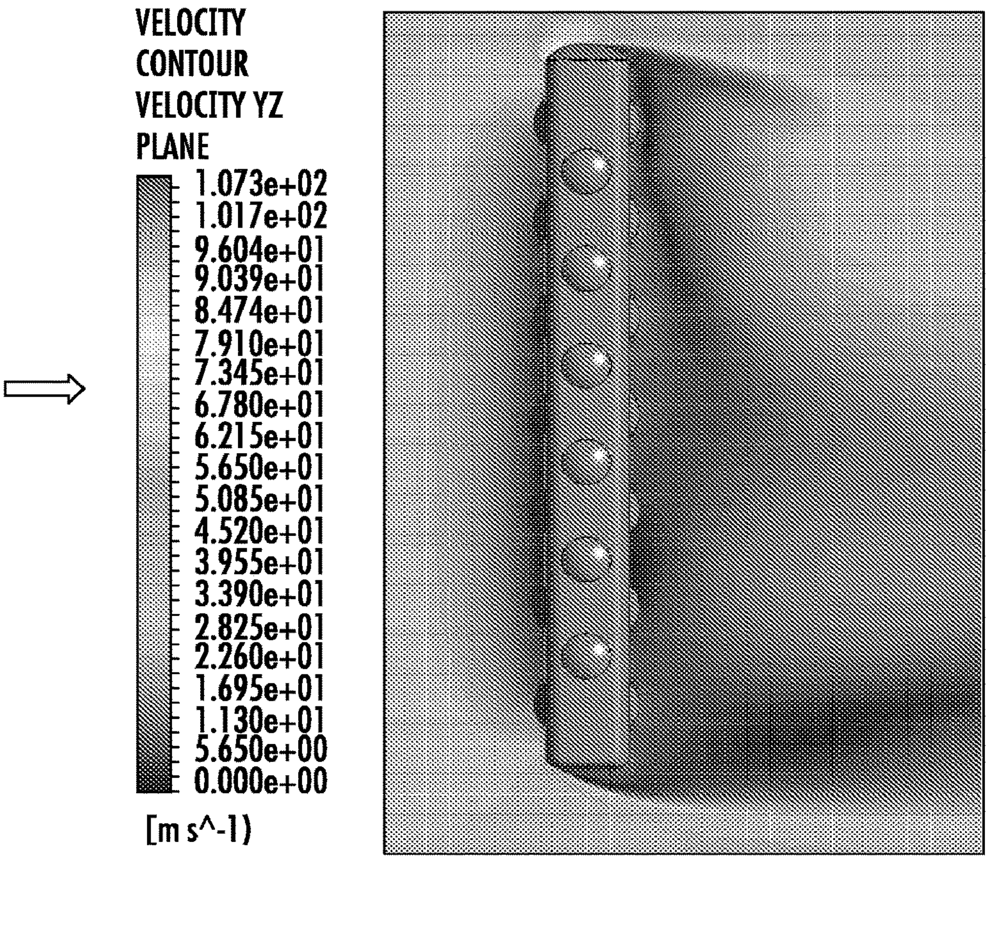
Figure 18A:
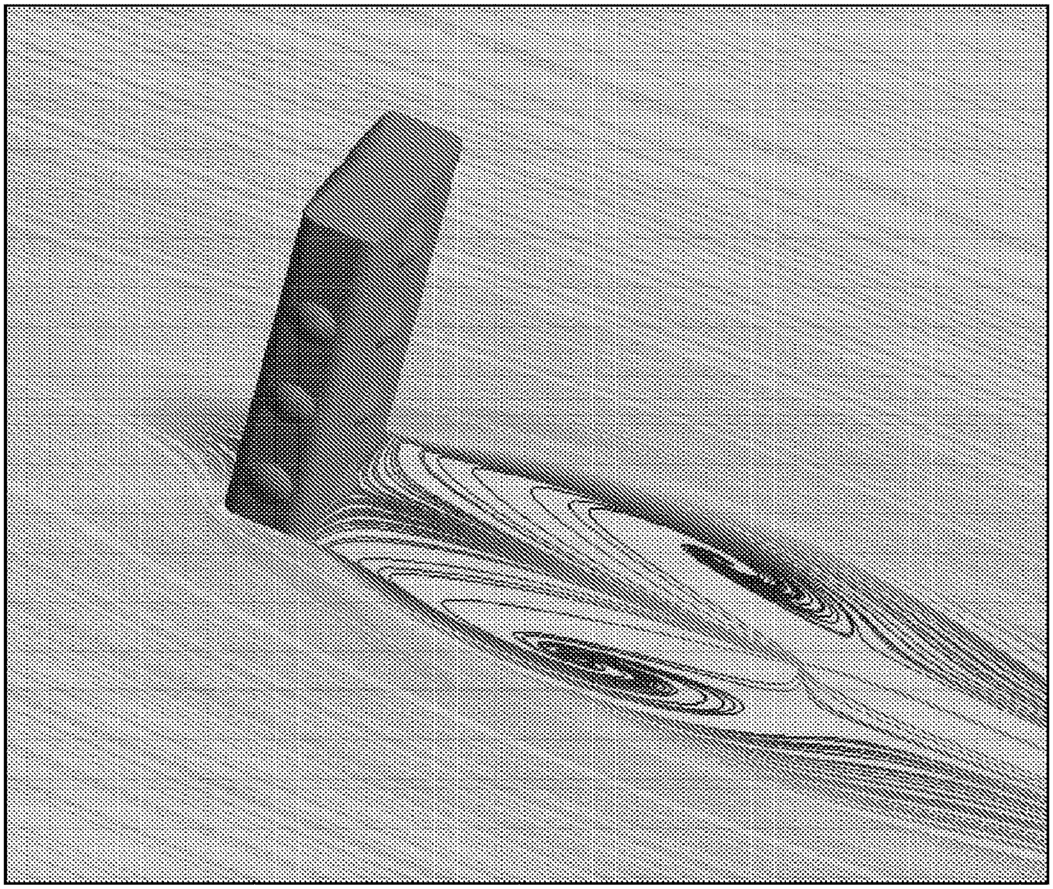
FIGS. 18A-B show perspective and top views, respectively, of velocity streamline plots for frontal wind loading of the antenna of FIG. 5.
Figure 18B:
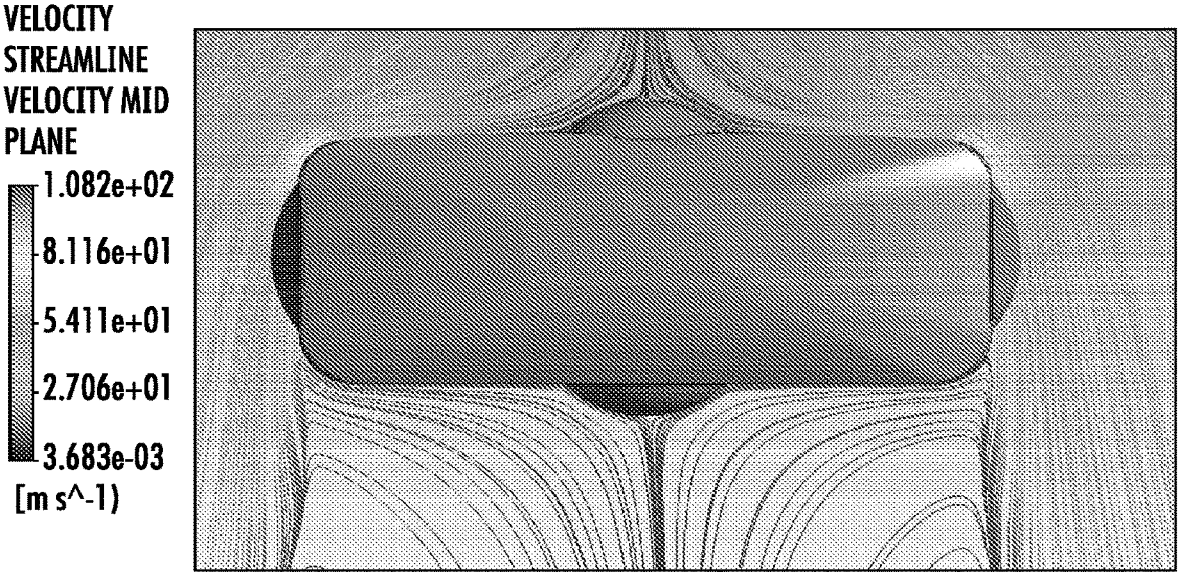
Figure 19:
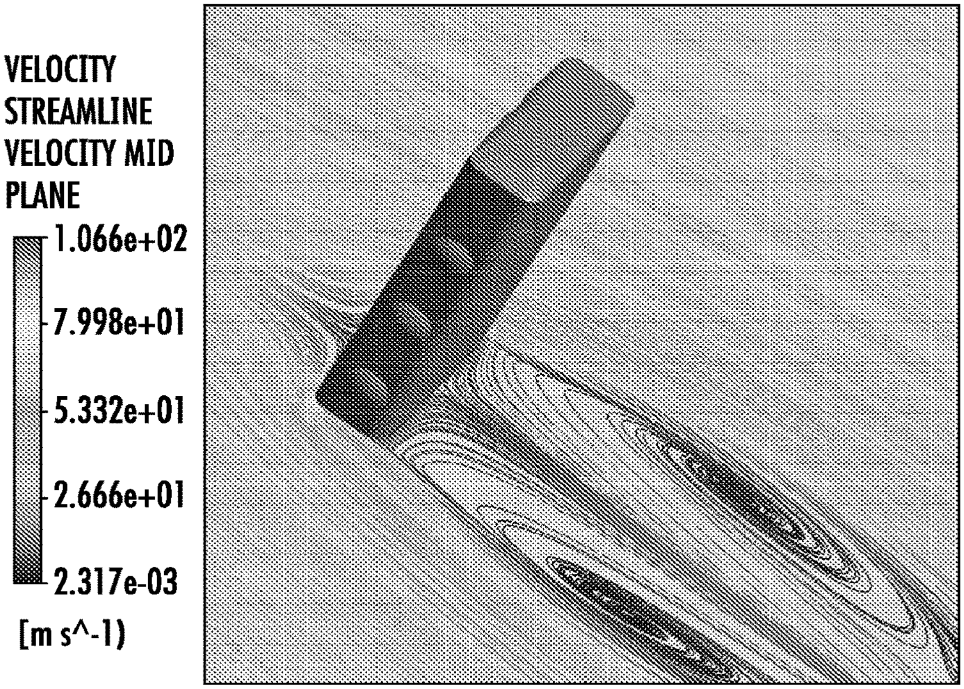
FIG. 19 is a perspective view of a velocity streamline plot for frontal wind loading of the antenna depicted in FIG. 7.
Figure 20A:
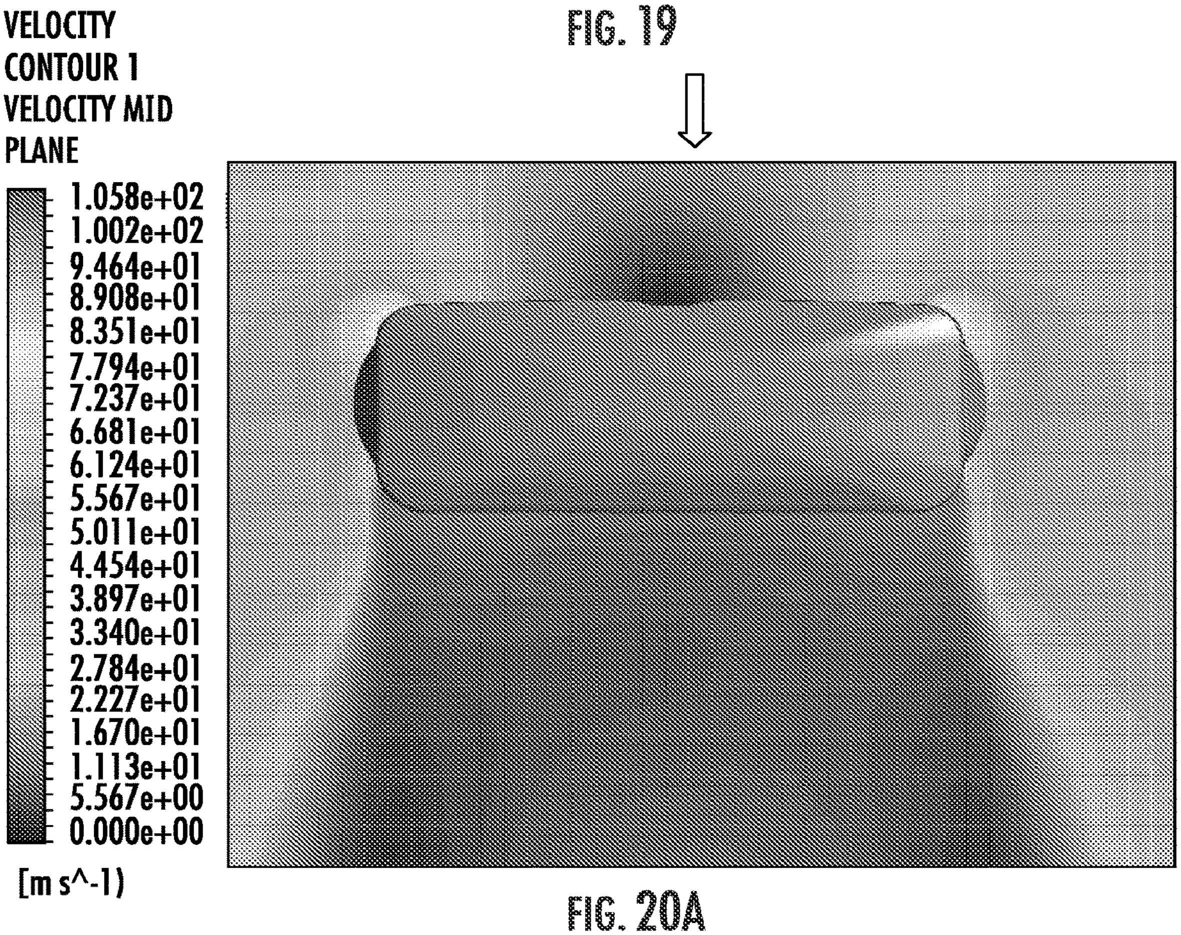
FIGS. 20A-C show top views of velocity contour plots for frontal, 20 degree frontal and lateral wind loading of the antenna of FIG. 7.
Figure 20B:
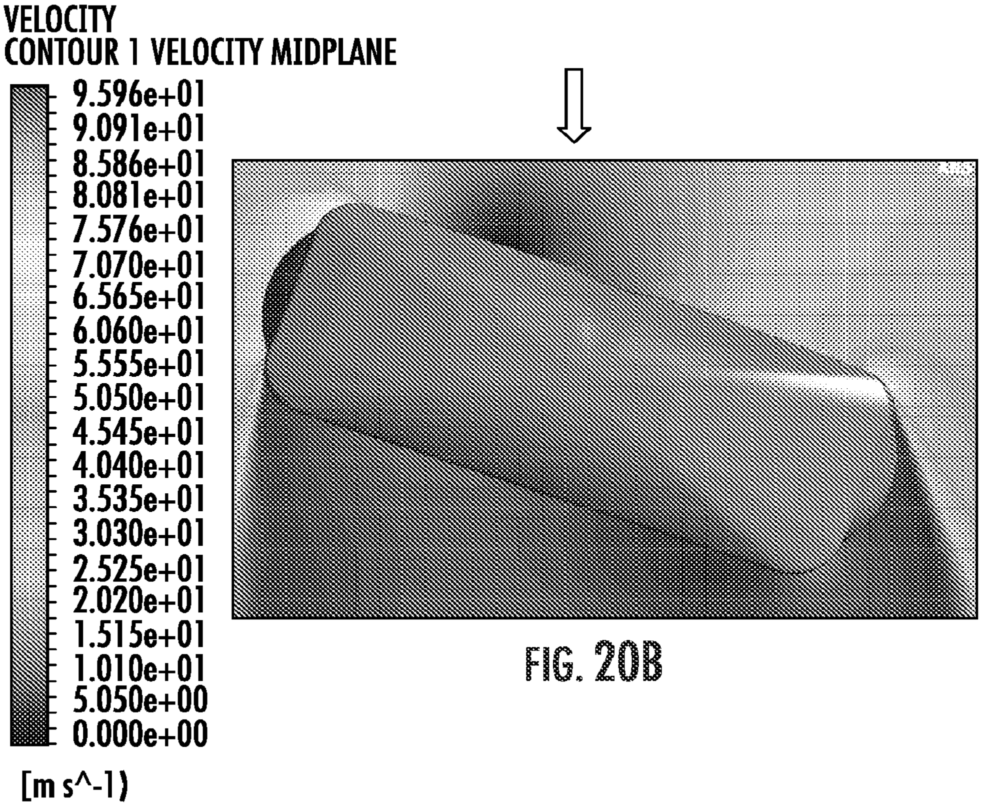
Figure 20C:
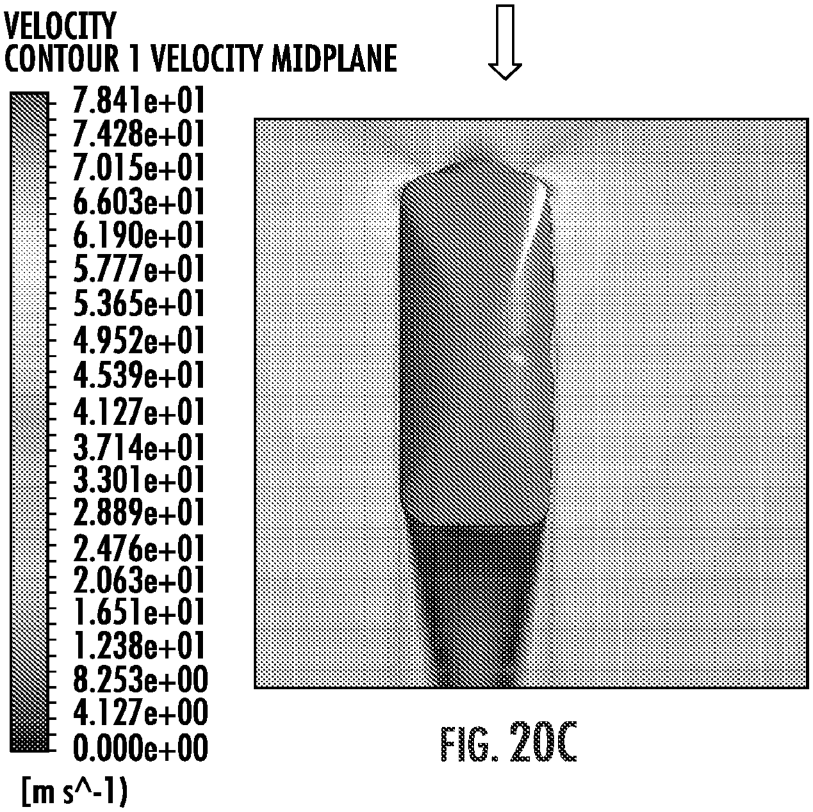
Figure 21:
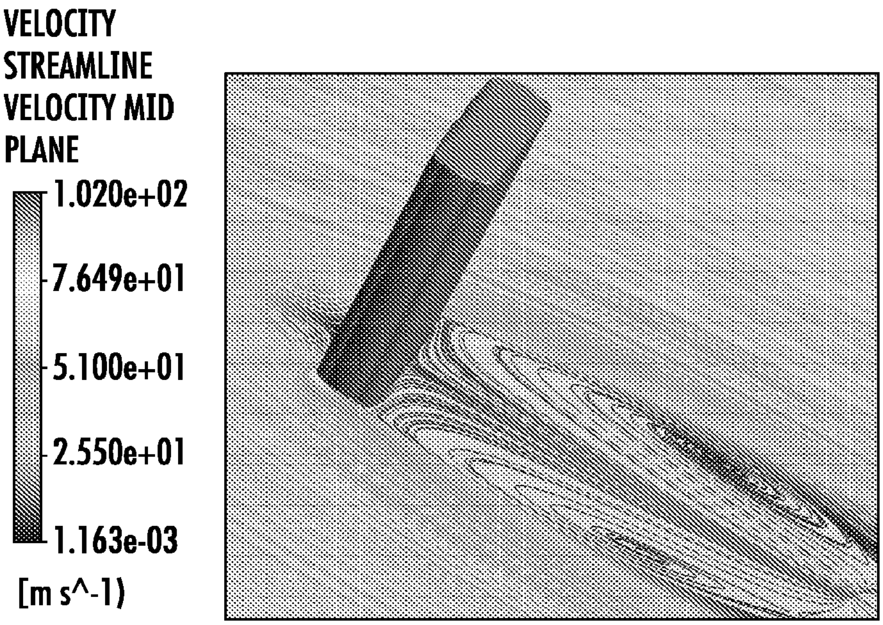
FIG. 21 is a perspective view of a velocity streamline plot for frontal wind loading of the antenna depicted in FIG. 8.
Figure 22A:
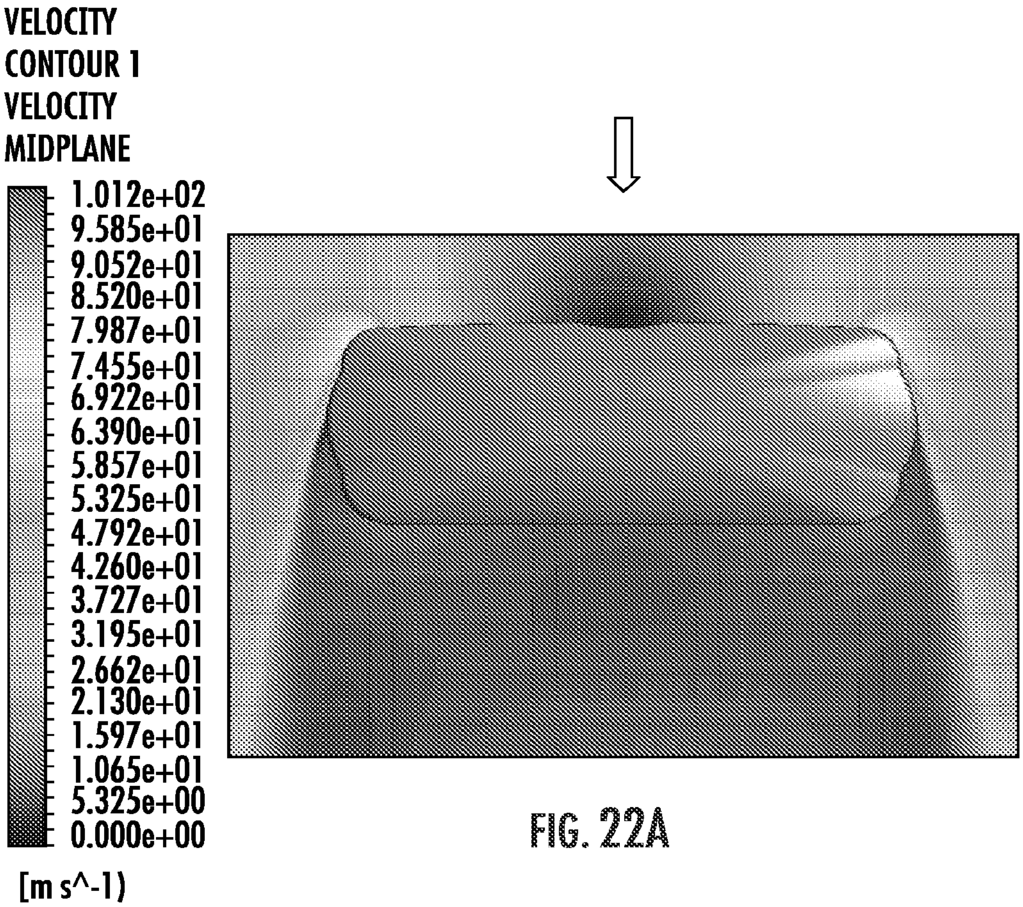
FIGS. 22A-C show top views of velocity contour plots for frontal, 20 degree frontal and lateral wind loading of the antenna of FIG. 8.
Figure 22B:
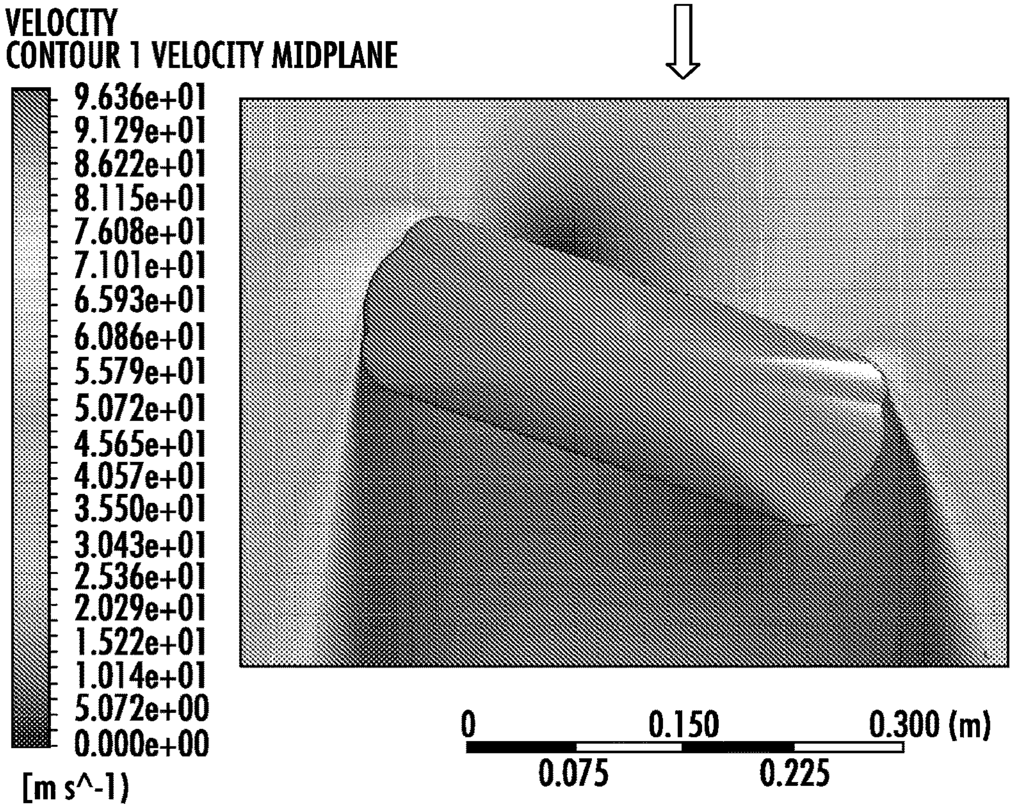
Figure 22C:
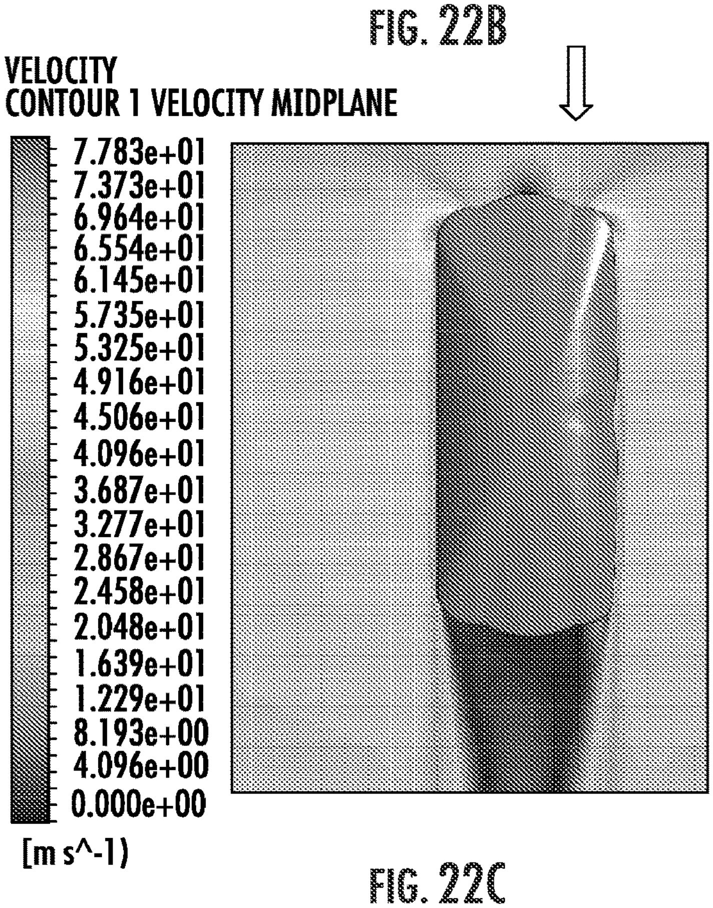

Some of the simulation results can be seen in FIGS. 13A-22C. FIGS. 13A-C show delayed flow separation caused by spiral ridges (center plot) and front, rear and side protuberances (bottom plot). FIGS. 14A-C show delayed flow for domed end caps (center plot) and large corner radius end caps (bottom plot). FIGS. 15A-C and 16A-C show delayed flow separation for (a) a combination of spiral ridges and domed end caps (center plot) and (b) front, rear and side protuberances, a domed top end cap and a large corner radius on the bottom end cap (bottom plot). FIGS. 17A-B and 18A-B reiterate the delayed flow separation seen for the combination of front, rear and side protuberances and a domed top end cap and a large corner radius on the bottom end cap. FIGS. 19 and 20A-C show delayed flow separation for frontal, 20 degree frontal and lateral loading for the antenna 700 of FIG. 7, which has side protuberances, a domed top end cap and a large corner radius on the bottom end cap. FIGS. 21 and 22A-C show delayed flow separation for frontal, 20 degree frontal and lateral loading for the antenna 800 of FIG. 8, which has continuous side protuberances, a domed top end cap and a large corner radius on the bottom end cap.

Example 2

Figure 23:
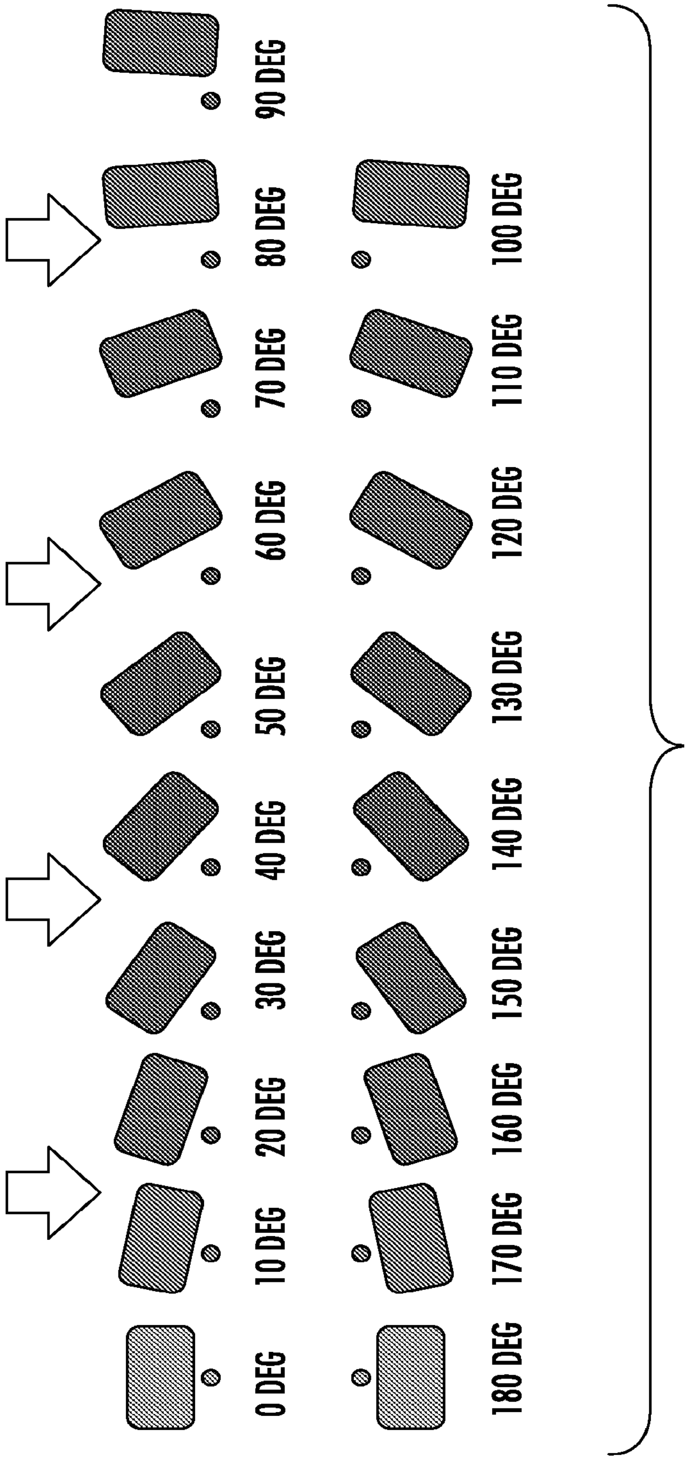
FIG. 23 is a schematic illustration of the orientation of an antenna mounted on a pole for each of a number of wind loading tests.
Figure 24C:
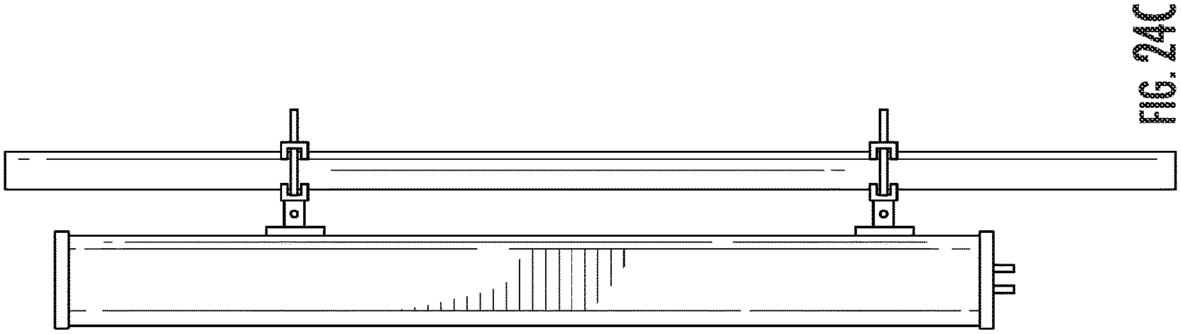
FIGS. 24A-C, 25A-C, 26A-C, 27A-C, and 28A-C are perspective, front and side views of antennas on which wind loading tests were performed.
Figure 24B:
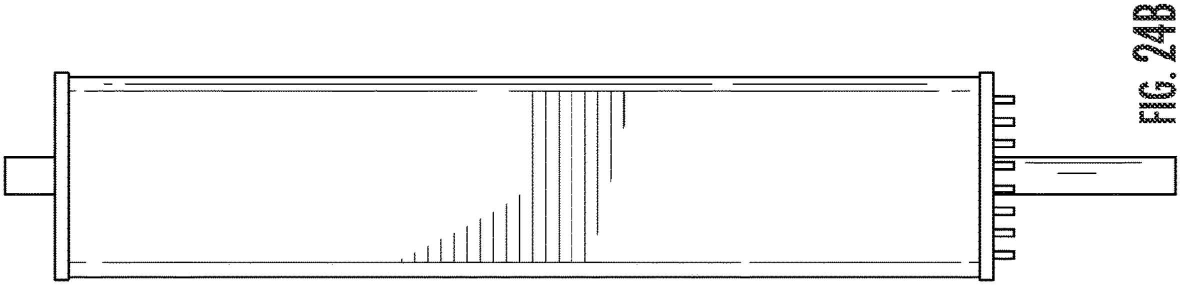
Figure 24A:
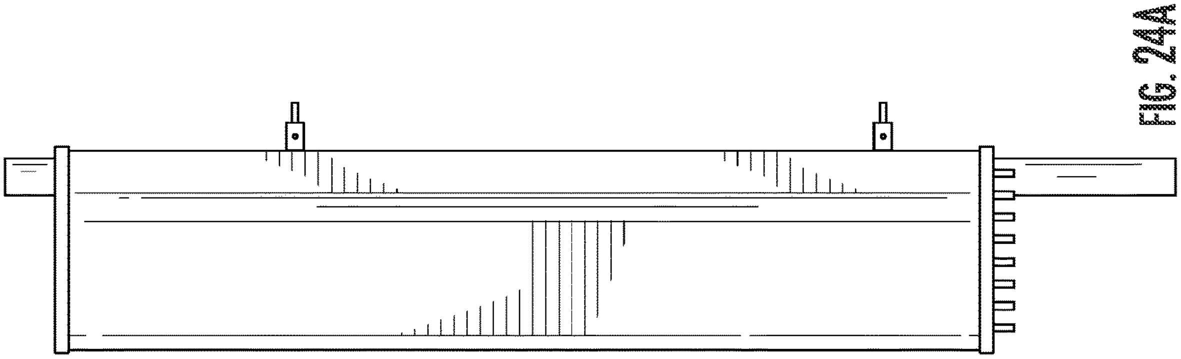
Figure 25C:
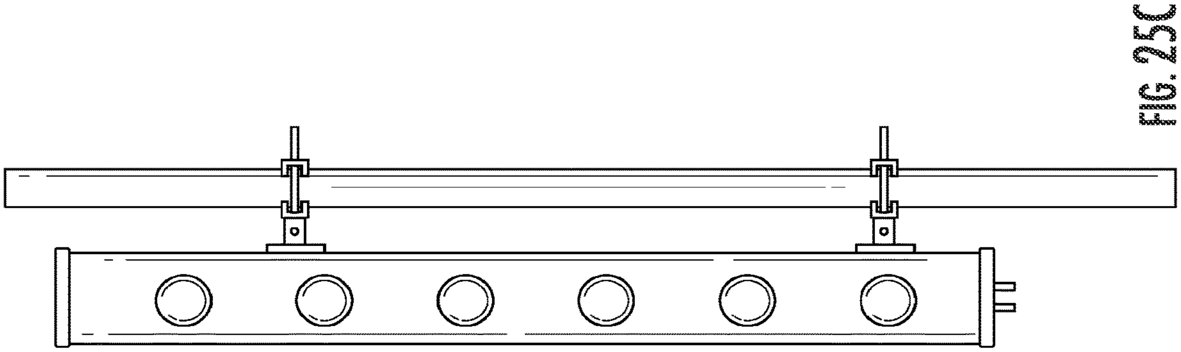
Figure 25B:
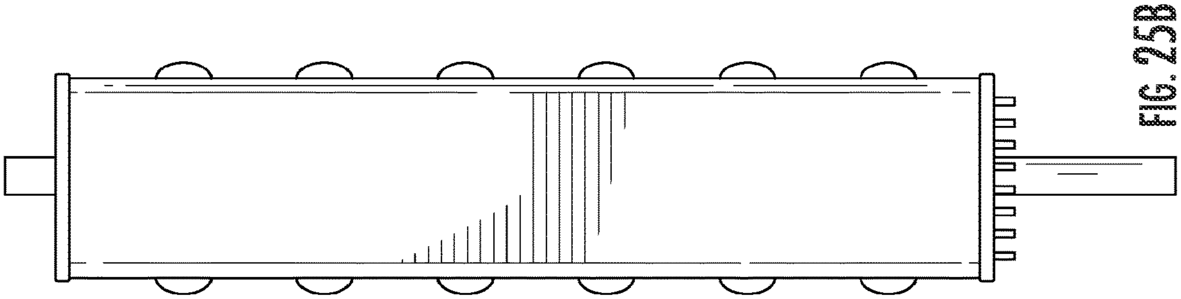
Figure 25A:
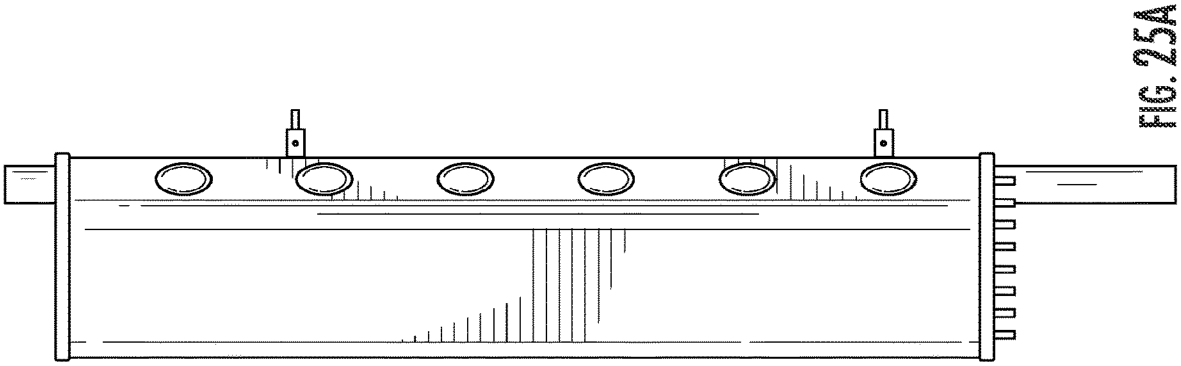
Figure 26C:
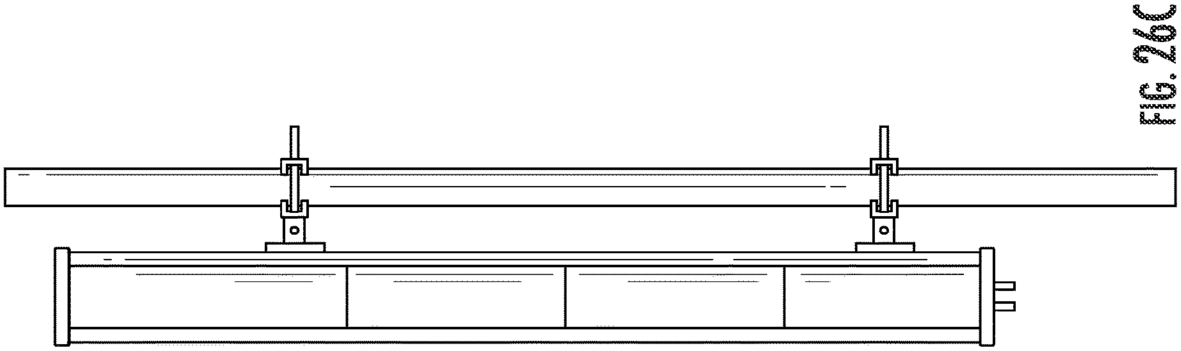
Figure 26B:
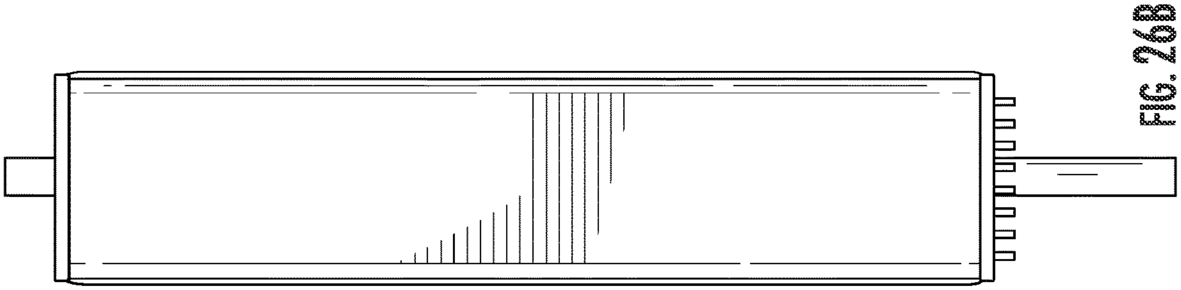
Figure 26A:
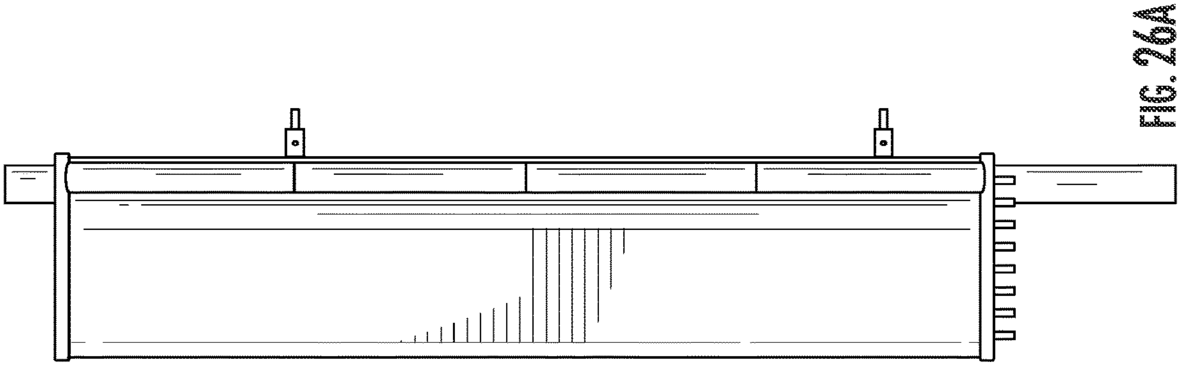
Figure 27C:
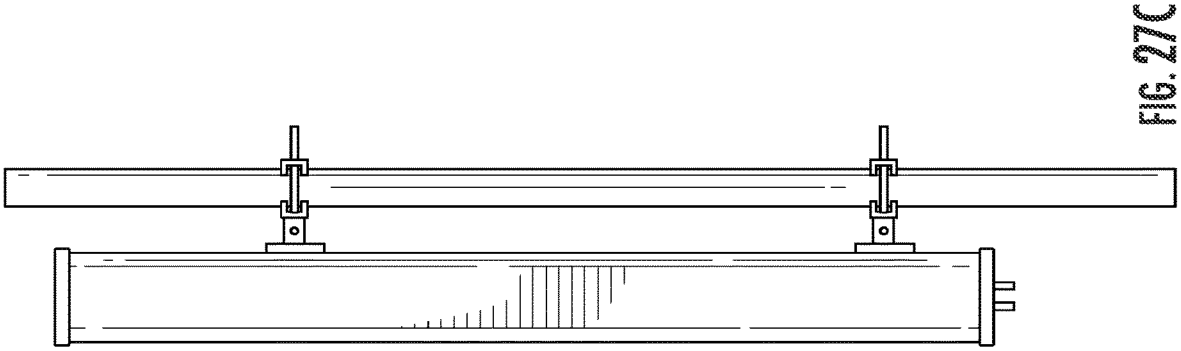
Figure 27B:
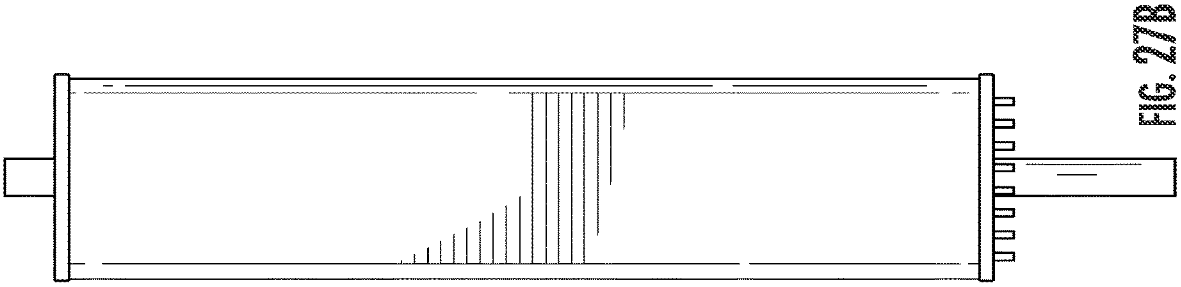
Figure 27A:
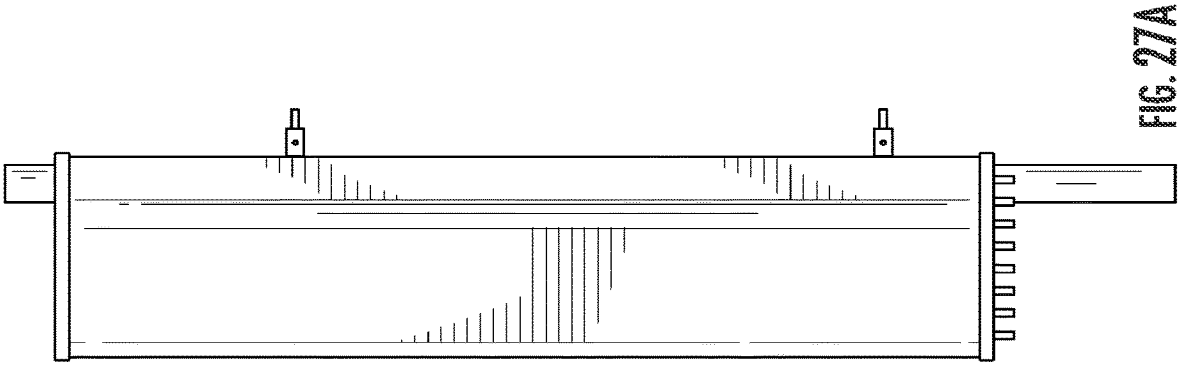
Figure 28C:
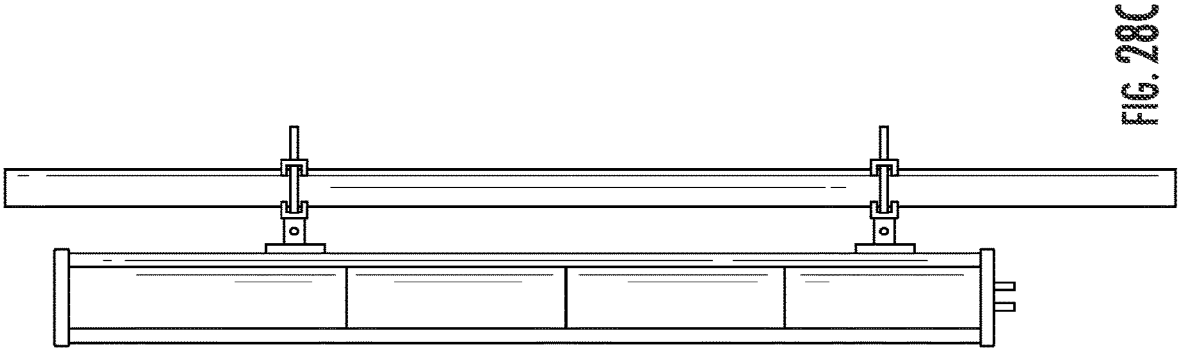
Figure 28B:
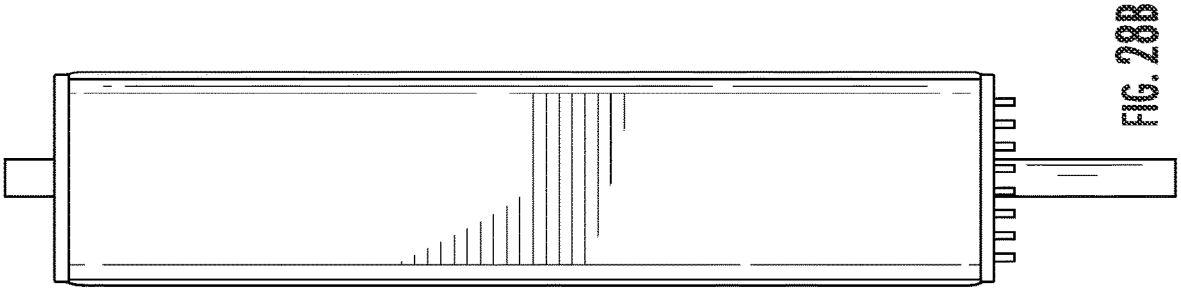
Figure 28A:
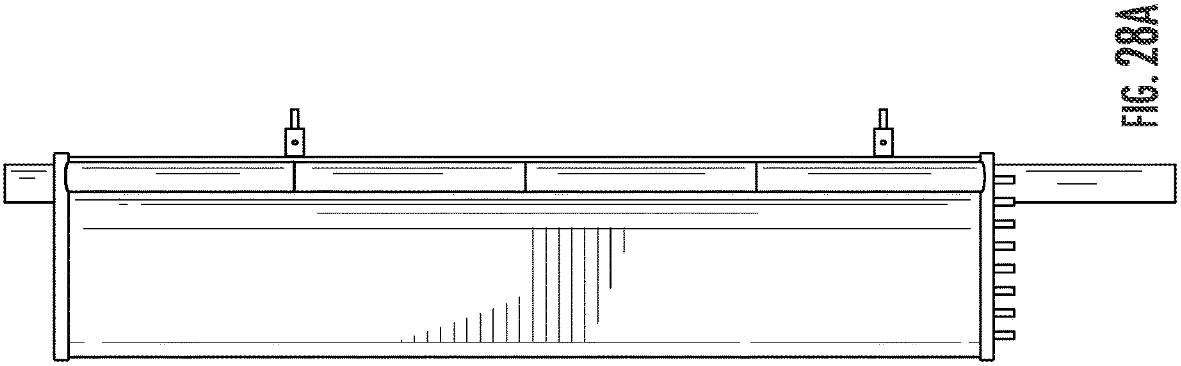

Actual wind load testing was conducted in a wind tunnel. FIG. 23 is a schematic diagram that indicates the orientation of the antenna and the pole to which the antenna is mounted for different wind loading conditions. The testing process and data analysis are described in some detail at https://www.commscope.com/globalassets/digizuite/3502-wind-load-testing-for-aerodynamically-efficient-bsa-wp-112534-en.pdf. Table 2 sets forth the configurations of the antennas tested.

| Antenna Identifier | Features |
|---|---|
| 430-BL (FIGS. 24A-C) | Baseline antenna (1848 mm × 430 mm × 197 mm) |
| 430-A (FIGS. 25A-C) | Baseline antenna with side protuberances |
| 430-B (FIGS. 26A-C) | Baseline antenna with continuous side protuberances |

-continued

| Antenna Identifier | Features |
|---|---|
| 430-C (FIGS. 27A-C) | Baseline antenna with large radiused end caps |
| 430-BC (FIGS. 28A-C) | Baseline antenna with continuous side protuberances and large radiused end caps |
| 430-CD (no specific figure) | Baseline antenna with large radiused bottom end cap and domed top end cap |
| 430-BCD (no specific figure) | Baseline antenna with continuous side protuberances, large radiused bottom end cap and domed top end cap |

Figure 29A:
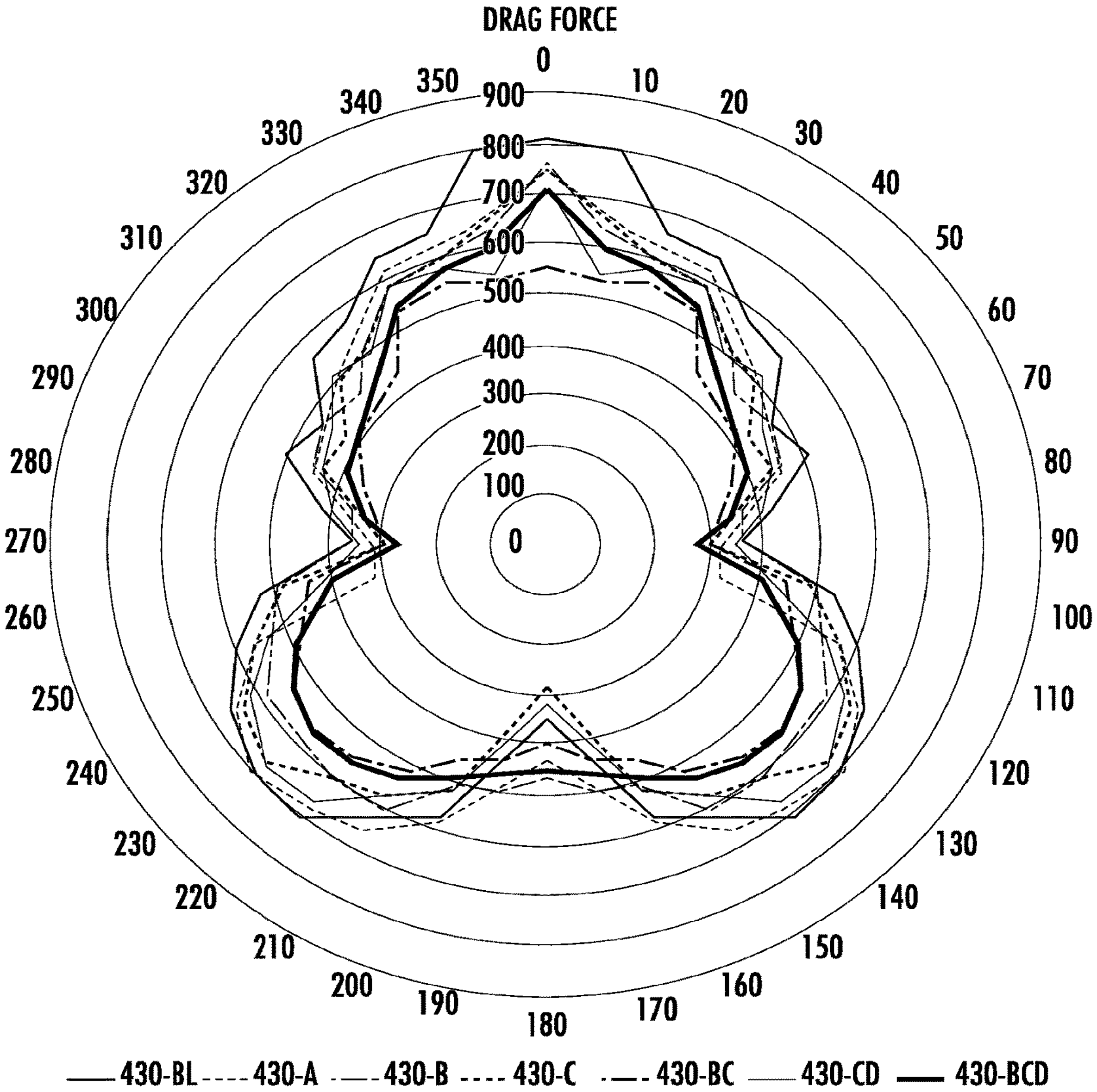
FIGS. 29A and 29B are graphs plotting the drag force and resultant force measured during testing of multiple antenna configurations.
Figure 29B:
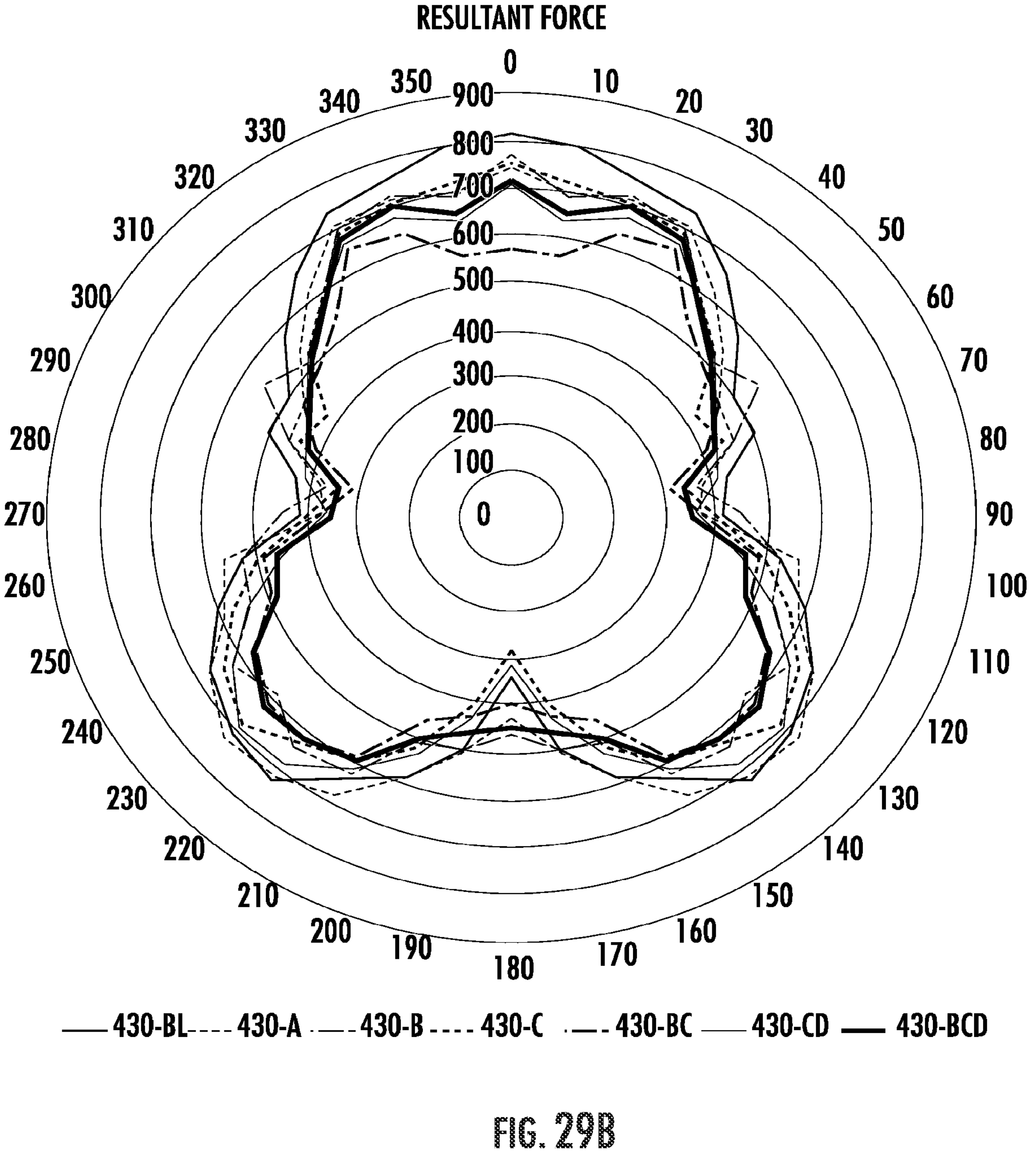

FIGS. 29A and 29B show the drag force and resultant force results of wind tunnel tests conducted on different antenna configurations. It can be seen that the lowest overall loads (for both drag force and resultant force) are experienced by antenna 430-BC of FIGS. 28A-C, which has large radiused end caps and a continuous side protuberance on each side surface.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A reduced wind load antenna, comprising:
- a radome having front, rear, and side surfaces;
- upper and lower end caps attached to upper and lower ends of the radome to define an internal cavity;
- radiating elements positioned within the internal cavity and configured to transmit and receive radio frequency (RF) signals through the front surface of the radome;
- wherein the antenna includes at least one airflow separation protuberance extending rearwardly from the rear surface of the radome;
- wherein the at least one airflow separation protuberance has a base diameter of between about 100 and 150 mm.

2. The antenna defined in claim 1, wherein the at least one protuberance is a plurality of protuberances.

3. The antenna defined in claim 2, wherein the plurality of protuberances comprises two protuberances.

4. The antenna defined in claim 1, wherein the at least one airflow separation protuberance has an arcuate outer surface.

5. The antenna defined in claim 1, wherein the antenna includes large radiused corners on the lower end cap.

6. The antenna defined in claim 1, wherein the front surface includes no protuberances.

7. A reduced wind load antenna, comprising:
- a radome having front, rear, and side surfaces;
- upper and lower end caps attached to upper and lower ends of the radome to define an internal cavity;
- radiating elements positioned within the internal cavity and configured to transmit and receive radio frequency (RF) signals through the front surface of the radome;
- wherein the antenna includes at least two airflow separation protuberances extending rearwardly from the rear surface of the radome;
- wherein the antenna includes large radiused corners on the lower end cap.

8. The antenna defined in claim 7, wherein each of the at least two airflow separation protuberances has an arcuate outer surface.

9. The antenna defined in claim 7, wherein each of the at least two airflow separation protuberances has a base diameter of between about 100 and 150 mm.

10. The antenna defined in claim 7, wherein the front surface includes no protuberances.

11. A reduced wind load antenna, comprising:
- a radome having front, rear, and side surfaces;
- upper and lower end caps attached to upper and lower ends of the radome to define an internal cavity;
- radiating elements positioned within the internal cavity and configured to transmit and receive radio frequency (RF) signals through the front surface of the radome;
- wherein the antenna includes at least two airflow separation protuberances extending rearwardly from the rear surface of the radome;
- wherein each of the at least two airflow separation protuberances has a base diameter of between about 100 and 150 mm.

* * * * *